July 19, 1955  O. E. KASE ET AL  2,713,390
RECORD RECODING AND REPRODUCING MACHINE
Filed Feb. 27, 1952  14 Sheets-Sheet 1

INVENTORS
OTTO E. KASE
EARL S. RICE
BY
ATTORNEYS

July 19, 1955    O. E. KASE ET AL    2,713,390
RECORD RECODING AND REPRODUCING MACHINE
Filed Feb. 27, 1952    14 Sheets-Sheet 3

INVENTORS
OTTO E. KASE
EARL S. RICE
BY
ATTORNEYS

INVENTORS
OTTO E. KASE
EARL S. RICE
BY
ATTORNEYS

Inventors
OTTO E. KASE
EARL S. RICE

FIG. 13

United States Patent Office 2,713,390
Patented July 19, 1955

2,713,390
RECORD RECODING AND REPRODUCING MACHINE

Otto E. Kase, Stamford, Conn., and Earl S. Rice, Fanwood, N. J., assignors, by mesne assignments, to the United States of America as represented by the Secretary of the Navy Application February 27, 1952, Serial No. 273,666

9 Claims. (Cl. 164—114)

This invention relates to record controlled business or accounting machines and has more specific relation to machines of this general class which operate to enter in records, such as cards or the like, a data representative pattern which may be in the form of selectively spaced perforations, spots, or other readily identifiable data representative medium.

More particularly the embodiment of the invention as herein disclosed is shown as one adapted for use in reproducing on one record form, such as a punched card, data contained on another record form, wherein the data is reproduced on said first mentioned record form in a coded pattern, different from that of said latter mentioned record form.

At the present time there are two well-known forms of punched cards in common usage, one being known as the "Hollerith" card, the other being known as the "Powers" card. The "Hollerith" card contains eighty columns, each column having twelve index positions for use with a code wherein numerical data is represented by a single perforation within the column, and alphabetic data is represented by a combinational perforation pattern consisting of two index positions per column.

The "Powers" card contains ninety columns comprised of two card zones of forty-five columns each, each column containing six index positions for use with a code, wherein numerical data is represented by either a single perforation or a combinational two-position perforation pattern which includes the "9" index position, and wherein alphabetic data is represented by either a combinational three-position pattern, or a two-position pattern not employed in representing numeric data.

There have been heretofore disclosed mechanically controlled machines for reproducing records in a dissimilar code, such being the machine disclosed in patent to Lasker No. 2,108,681, issued February 15, 1938, and also in patent to Braun No. 2,387,828, issued October 30, 1945. However, although these prior disclosures show machines and means for recoding and setting up punch gags in a dissimilar code, wherein either or both of the codes may employ a multiple or a combinational perforation pattern, the recoding means of said disclosures operable for recoding to combinational codes such as the "Powers" code above mentioned are of a capacity adaptable only for the recoding of data such as numerals embraced within the limited range of ten digits and are not adaptable for the recoding of alphabetic data or alphabetic and numerical data combined which embraces the more extended range of twenty-six alphabetic characters or thirty-six combined digits and characters, respectively.

One object of this invention is to enable the recoding of alphabetic and numerical data, wherein said data is represented by a coded pattern employing multiple or combinational index positions.

A further object of this invention is to enable the recoding of alphabetic and numerical data represented by a code employing a predetermined number of index positions into a pattern in a dissimilar code employing a lesser number of index positions.

A further object of this invention is to enable the continuous and automatic reproduction of record forms, containing representative patterns of alphabetic and numerical data in one code, into corresponding record forms wherein the same data is represented by patterns in another code.

In the embodiment of the invention herein disclosed, separate means are provided for feeding record forms or cards of two separate record groups in side by side relation. The cards of one of said groups contain the data to be reproduced, the cards of the other group being blank when fed to the machine in order to receive in a recoded pattern the data sensed from the related one of said first mentioned group of records. For the sake of convenience, the records or cards of said first mentioned record group will hereinafter be referred to as master cards, and the records of said second mentioned group will hereinafter be referred to as detail cards. A sensing stage is provided for said first mentioned master cards, and a punching stage is provided for said second mentioned detail cards, into which punching stage the detail card enters at a time subsequent to the sensing of the related master card. The data sensed in the master cards is transferred to a recoding unit which is settable in accordance with said data in the code of the master cards for selectably enabling a field of punch elements associated with the detail cards. When the detail card reaches the punching stage, said punch elements are effective for causing punching therein, in the code of the detail cards, of the data sensed in the related master card.

Means are provided for disabling pre-selected columns of said punch elements in the event that it is desired to reproduce only a portion of the master card. Means are also provided to correlate the feeding of the respective card groups so as to prevent an interruption of sequence which might otherwise result from an exhausted card supply or from a misfeed during the operation of the machine.

Other features, together with additional objects of the invention, will become apparent from the following description when read in conjunction with the drawings, wherein:

Figs. 1 and 2 together are a sectional plan view of the machine taken on a plane above the sensing and punching mechanism substantially along the lines 1—1 and 2—2 of Figs. 6 and 4, respectively.

Figs. 3 and 4 together are a sectional view of the machine from the right hand side, Fig. 4 being taken along the line 4—4 of Fig. 2.

Figs. 5 and 6 together are a sectional view of the machine from the right hand side, Fig. 6 being taken along the line 6—6 of Fig. 1.

Figs. 7 and 8 together are a sectional view of the machine taken along the same sectional line as Figs. 3 and 4, but with the parts shown in mid-cycle position.

Fig. 9 is a schematic view of the recoding unit of the machine in a normal position and illustrating the various settable positions for the parts.

Figs. 10 and 11 together are an isometric view of the two main drive shafts showing all the operating cams and related parts directly associated therewith.

Fig. 13 is a view of the master and detail cards illustrating the respective codes employed therewith.

Figure 1:
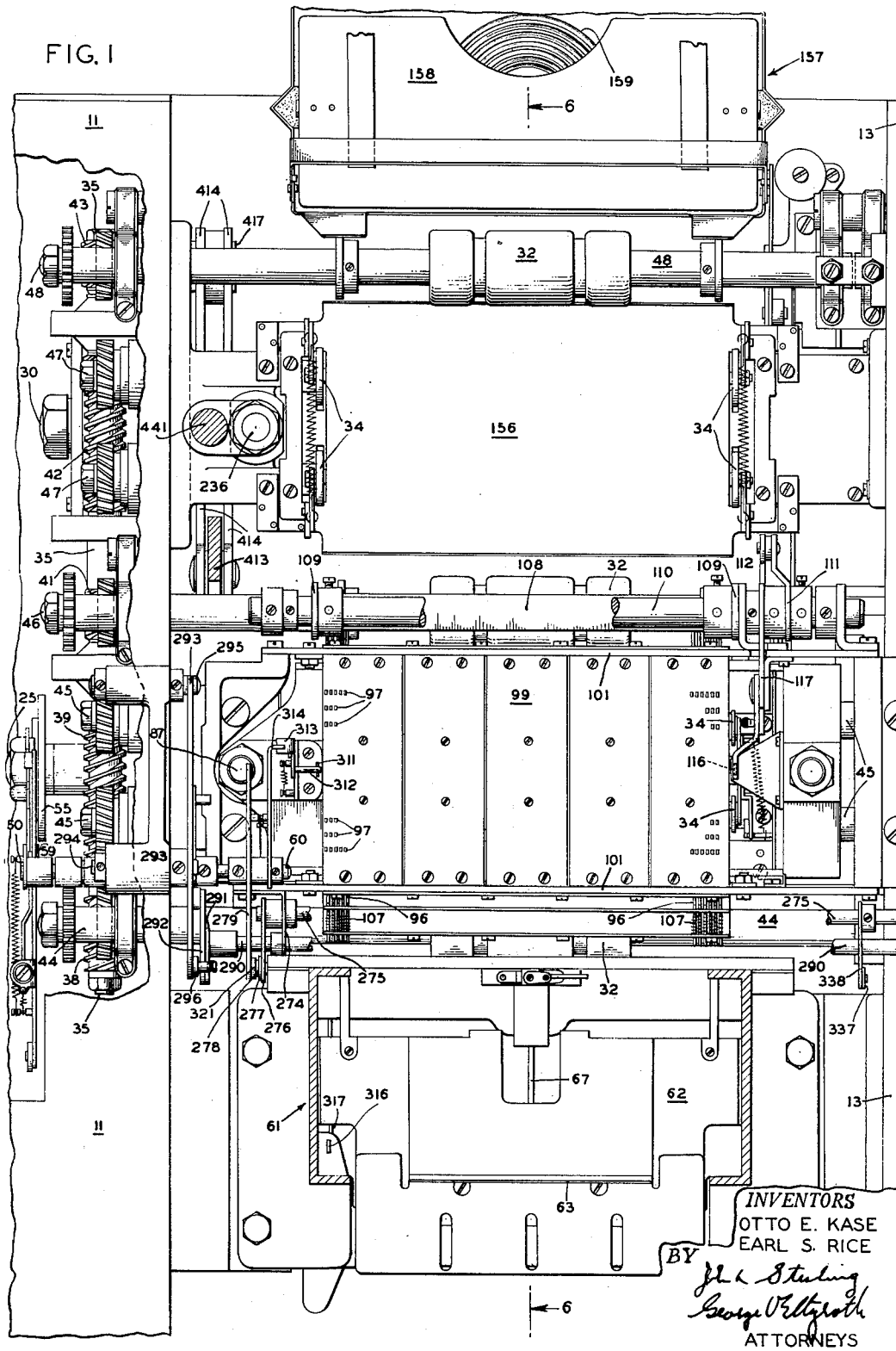

The main driving mechanism of the machine is supported by a base framework which, except for certain variations and dimensions as required for accommodating two separate card feeding mechanisms, is substantially similar to the base framework of the machine disclosed in the above mentioned patent to Braun 2,387,828. As can be best seen in Fig. 1, the left-hand base frame comprises an upright frame casting 11 which supports the left-hand end of the main shafts, associated gearing, and a start-stop mechanism of the same type as shown in said patent to Braun. The right-hand base frame, as seen in Fig. 2, comprises a similar upright frame casting 12 which supports the right-hand end of the main drive shafts, associated gearing and the main drive clutch mechanism 14. As distinguished from said patent to Braun, the present machine is designed to include two separate record feeding mechanisms disposed in side by side relation, which requires spacing of the frames 11, 12 a further distance apart than in said patent, thereby necessitating provision of an additional base frame comprising a center frame plate 13 which gives additional support to the main drive shafts, and also carries other parts relating to the separate feeding mechanisms.

Figure 4:
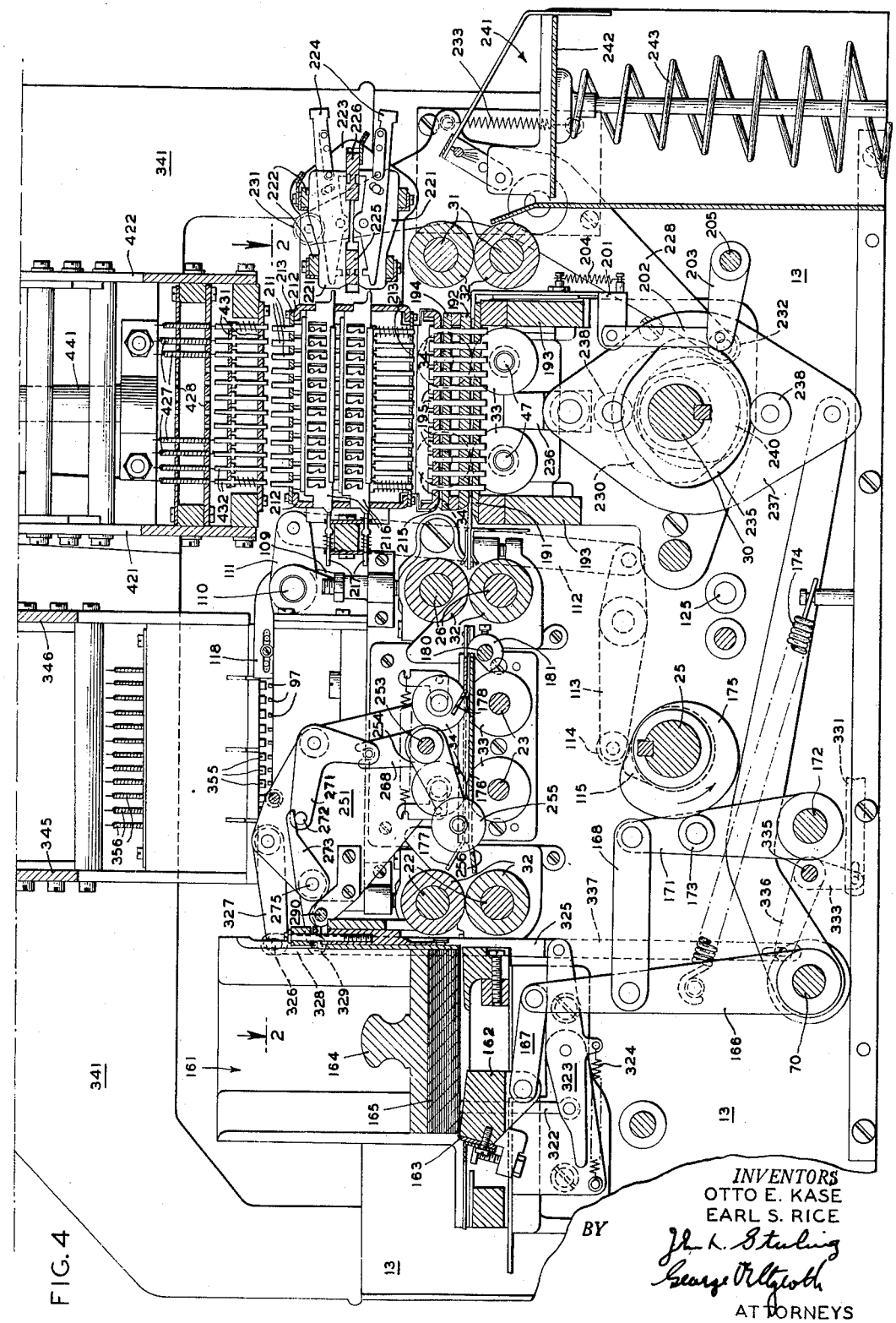

Suitably journaled in the right hand base casting 12 is a worm shaft 15 (corresponding substantially to the shaft 74 of said patent to Braun), which shaft carries a series of worm gears 16, 17, 18, 19, 21, which drive the transversely disposed main drive shaft, together with the feed and skid rolls associated with the right hand or detail card feeding mechanism. The arrangement is similar to that of said patent to Braun (Fig. 8 thereof), whereby the worm gear 16 engages a worm wheel on the lower one of a pair of shafts 22, see also Fig. 4, hereinafter referred to as the front detail feed roll shafts. The worm gear 17 engages worm wheels carried by a pair of shafts 23 extending through the center frame plate 13 and which carry the front skid rolls of the detail feed mechanism and the right-hand front skid rolls of the master card feed mechanism. Also driven by the worm gear 17, by a worm wheel not shown, is the front main drive shaft 25 (corresponding to shaft 80 of said patent to Braun) which shaft is suitably journaled in the right and left hand base frames 12, 11, and also in the center frame plate 13. The worm gear 18 meshes with a worm wheel carried by the lower one of a pair of intermediate feed roll shafts 26, and the worm gear 19 drives a pair of short skid roll shafts 27 which carry the rear right hand skid rolls of the detail card feeding mechanism. The worm gear 19 also drives the rear main drive shaft 30 (corresponding to shaft 90 of said patent to Braun) and which, like shaft 25, is suitably journaled in the base frames 11, 12, and 13. The worm gear 21 serves to drive the lower one of a pair of rear feed or eject roll shafts 31 which are suitably journaled in the base frame 12 and center frame plate 13. It will, of course, be understood that the aforementioned pairs of feed roll shafts 22, 26, 31, see also Fig. 4, are each provided with feed rolls 32 for gripping and conveying the detail cards through the various stages of the detail feeding mechanism, and that the aforementioned skid roll shafts 23, 27 are each provided with skid rollers 33 which in cooperation with yieldingly counted opposing pressure rollers 34 serve to advance the detail cards, when free to feed, to the next rearwardly adjacent pair of feed rolls 32.

Journaled in the left hand base casting 11 is a worm shaft 35 which is suitably driven by a worm wheel, not shown, mounted on the left hand end of the rear main drive shaft 30. Worm shaft 35 carries a series of worm gears 38, 39, 41, 42, 43 for driving the master card feeding mechanism in a manner similar to that of said patent to Braun wherein the single shaft 35 of the instant disclosure corresponds to two separately driven shafts (169, 191 of said patent). The worm gear 38 drives the lower one of a pair of front feed roll shafts 44, see also Fig. 6, and the worm gear 39 drives a pair of short skid roll shafts 45 associated with the front left hand side of the master card feeding mechanism. The worm gear 41 drives the lower one of a pair of intermediate feed roll shafts 46 suitably journaled in base frames 11, 13, and the worm gear 42 drives a pair of skid roll shafts 47 which extend through the center frame plate 13 and carry the rear skid rolls for the master card feeding mechanism and the rear left hand skid rolls for the detail card feeding mechanism. The worm gear 42 also meshes with the aforementioned worm wheel, not shown, on shaft 30 by which means shaft 35 is driven. Worm gear 43 drives the lower one of a pair of rear feed or eject roll shafts 48 which are suitably journaled in the base frames 11, 13. The above mentioned feed roll and skid roller shafts of the master card feeding mechanism are provided with rolls 32 and skid rollers 33, respectively cooperating with pressure rollers 34 in the same manner as hereinbefore described in connection with the detail card feeding mechanism.

Figure 10:
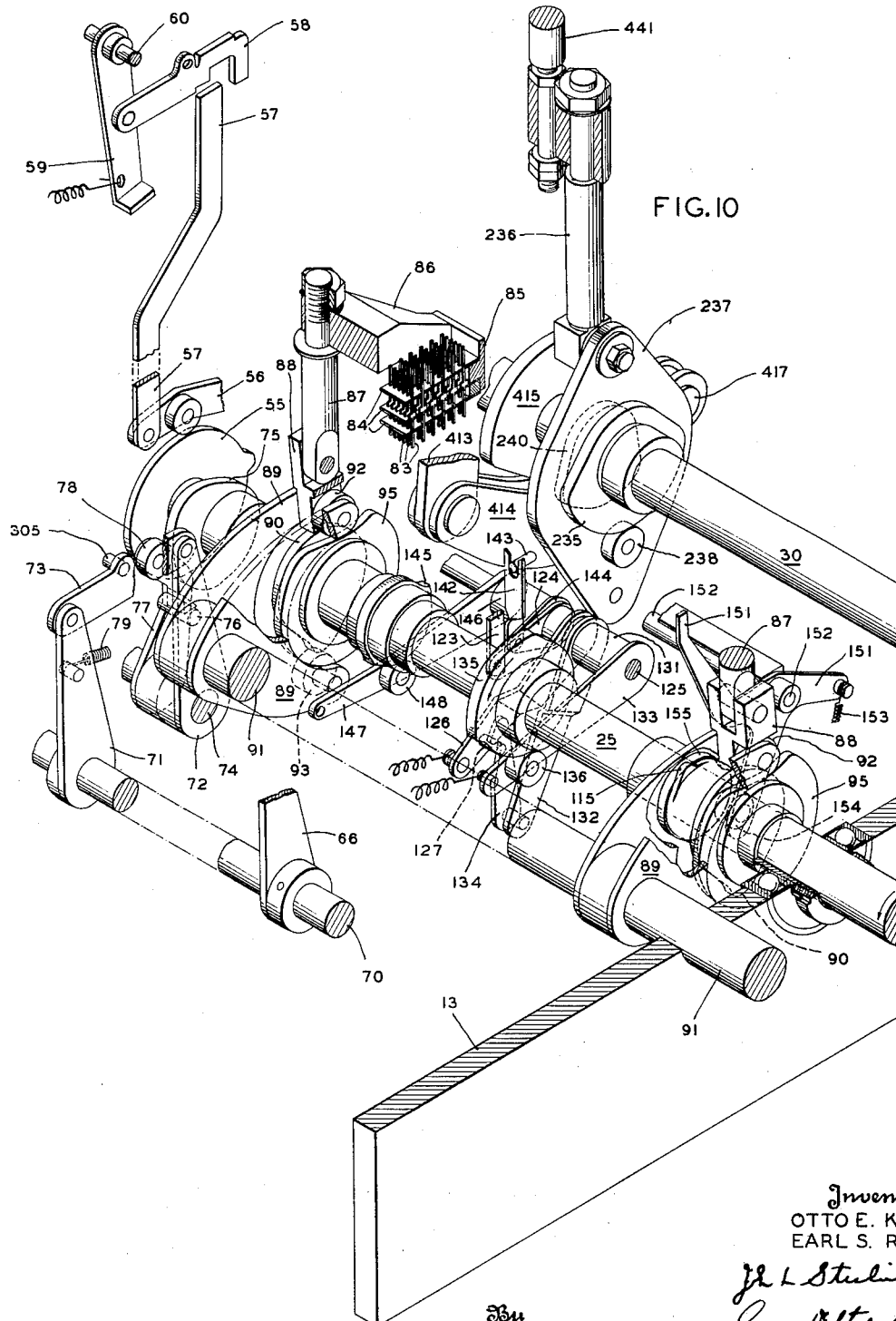
Figure 14:
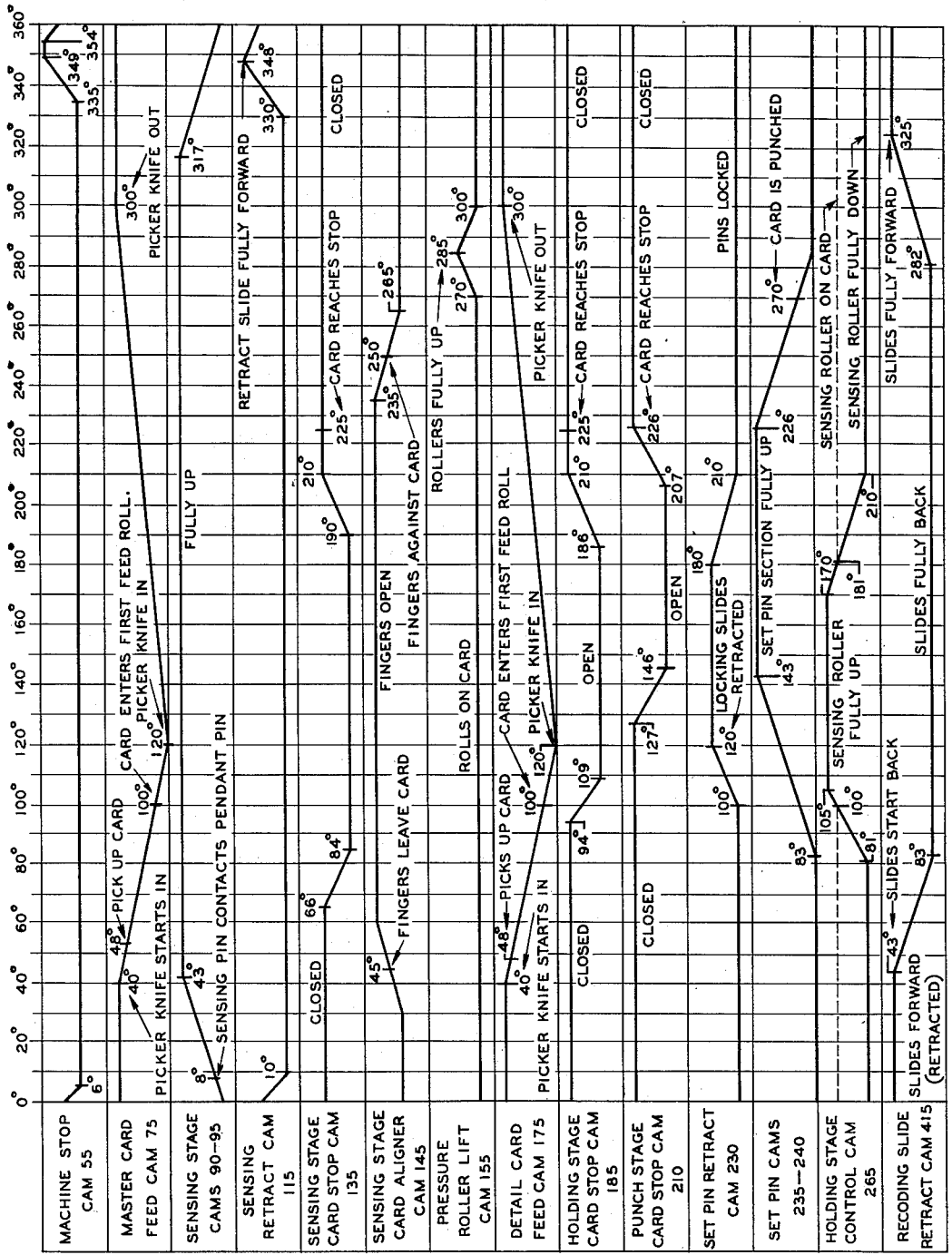
Fig. 14 is a timing diagram of the machine.

The above described drive shaft and separate feeding mechanisms are driven by a motor, not shown, operatively connected with the clutch mechanism 14, which clutch mechanism is actuated through a start-stop mechanism substantially identical to that more fully shown and described in said patent to Braun. As described therein the machine is started by means of a manually actuated button 54 Fig 16 of said patent) which, when pressed, acts to break a toggle joint, which toggle when straightened out, holds the clutch mechanism disengaged. Stopping of the machine is effected either manually or automatically through a cam actuated linkage causing said toggle to straighten to an effective holding position. Said linkage, which includes, as seen in Fig. 10 herein, a lever 56 and a push rod 57, is rendered effective manually by depressing the start-stop button or automatically by the rocking of a shaft 60 to cause a shiftable interponent 58 carried by a rock arm 59 fast on said shaft, to assume an effective position within said cam actuated train of linkage thereby stopping the machine. The machine stop cam 55 (corresponding to cam 83 of said patent to Braun) is keyed to the left hand end of the front main drive shaft 25, and the rock shaft 60, see also Fig. 1 (corresponding to rock shaft 117 of said patent to Braun) is suitably journaled in the left hand base frame 11. The start-stop cam 55, as can be seen by reference to the timing diagram, Fig. 14, is so designed as to be effective between 335° and 354° of the cycle thereby causing the maching to a stop at or about 360° of the cycle with the parts in the position as shown herein in Figs. 3–6.

Figure 2:
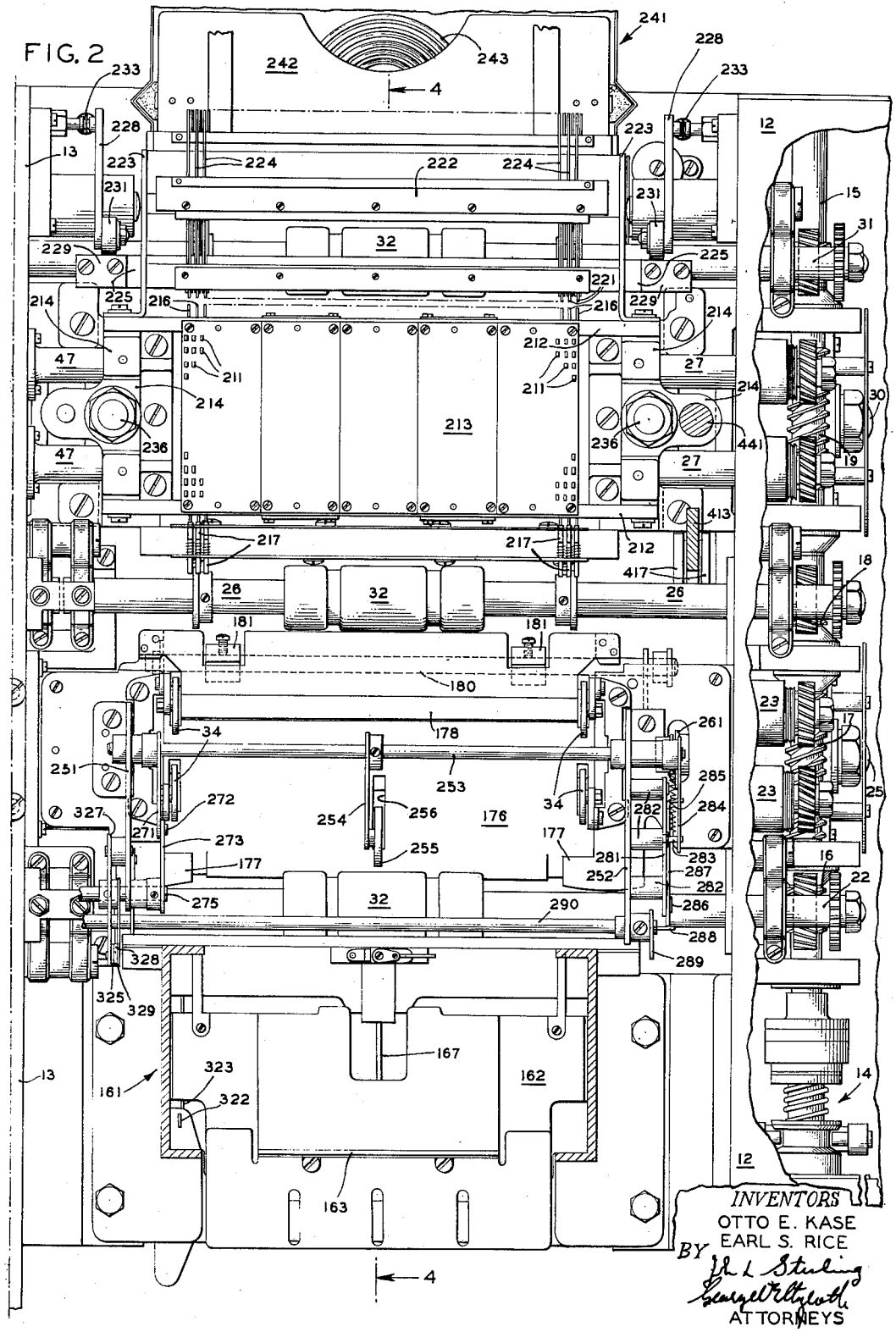
Figure 6:
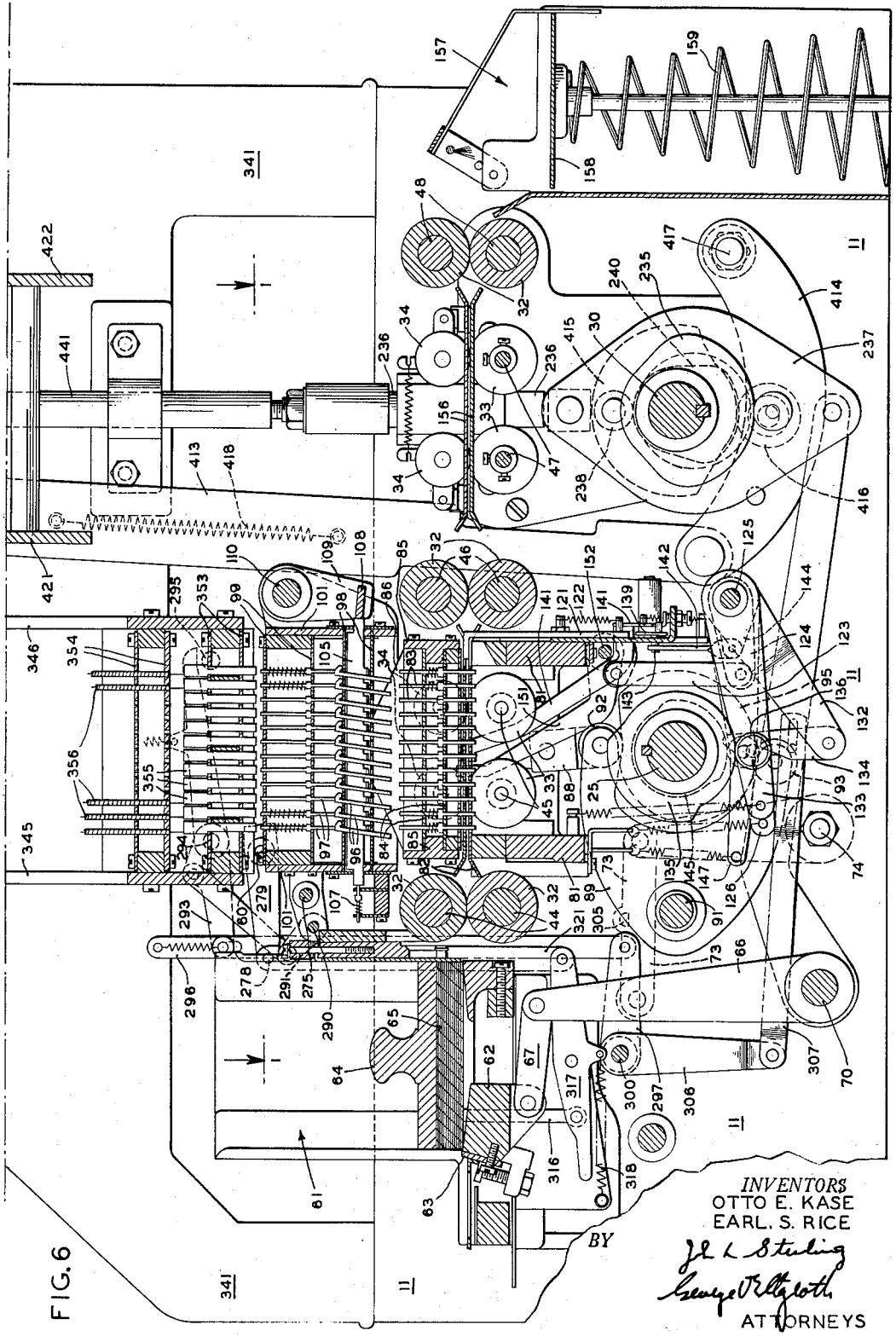

The master cards are fed seriatim from a master card supply magazine 61, Figs. 1 and 6, to the front master feed rolls 32 by a reciprocating feed block 62 and picker knife 63 of conventional type and actuated in a manner similar to that disclosed in the aforementioned patent to Braun. In Fig. 1 the master card supply magazine is shown without any cards arranged therein, while in Fig. 6 the magazine is shown with a stack of master cards 65 therein together with the usual card weight 64 bearing thereon. The feed block 62 is pivotally connected to a rock arm 66 by a link 67, said arm being fast on a rock shaft 70. Also secured fast to shaft 70 is an arm 71, best seen in Fig. 10, pivotally connected to a similarly shaped arm 72 by a link 73. The rock shaft 70 extends across the width of the machine being suitably journaled in the base frames 11, 13, 12, and the arm 72 is pivotally mounted on a stud shaft 74 secured to the left-hand base frame 11. A laterally projecting pin 76 carried by arm 72 is disposed for engagement by a follower arm 77 also mounted on stud shaft 74. The follower arm carries a roller 78 adapted to engage a cam 75 mounted on the front main drive shaft 25 and hereinafter referred to as the master card feed cam. A spring 79 connecting rock arm 71 with the machine frame serves to urge the roller 78 against the cam 75, whereby through rock shaft 70, the master card feed block 62 and picker knife 63 is yieldingly advanced to feed the lowermost card 65 out of the master card supply magazine and is subsequently positively returned by cam 75 and the aforementioned linkage to its normal position as shown in Fig. 6. As can be seen by reference to Fig. 14, cam 75 is effective for advancing the picker knife from 40° to 120° of the cycle and for returning the picker knife from 120° to 300° of the cycle, the master card reaching the front feed rolls 32 at about 100° of the cycle.

The master cards 65 are conveyed by the front feed rollers to a sensing stage wherein, when the movement of the card is temporarily arrested, the data pre-punched in the master card is sensed and transmitted to the recoding mechanism of the machine, the operation of which will be hereinafter more fully described. The master card sensing means is of the same type as shown and more fully described in the said patent to Braun and comprises, as best seen in Fig. 6, a pair of stationary frame bars 81 extending between the base frame 11 and center frame 13, said bars supporting a pair of horizontally disposed plates 82 suitably perforated and spaced apart to form a sensing chamber for cards fed therebetween by the front master card feed rollers 32. Disposed immediately above the sensing chamber is a field of sensing pins 83, including one for each index position of the master cards, which pins are suitably supported for yielding movement within a reciprocating sensing pin box. The sensing pin box, see also Fig. 10, is comprised of a series of pin supporting perforated guide plates 84 mounted on and between a pair of transverse bars 85 secured to a pair of end castings 86. The end castings are each joined to vertical rods 87, the lower ends of which are pivotally connected by means of gudgeons 88 to follower yokes 89 loosely mounted on a support rod 91. The yokes 89 are each of a double wall construction, each yoke carrying a pair of follower rollers 92, 93 which cooperate with associated pairs of complementary cams 90, 95 mounted on the front main drive shaft 25. From the foregoing it will be seen that each revolution of the drive shaft 25 operates through cams 90, 95 to raise and lower the sensing pin box once each cycle, it being understood that the rods 87 are suitably housed by means not shown for causing the sensing pin box to reciprocate in a plane perpendicular to that of the sensing chamber. By reference to Fig. 14, which will be seen that cams 90, 95 are effective for raising the sensing pin box from 0° to 43°, holding it raised from 43° to 317° and for lowering the pin box to its lower effective sensing position, as shown in Fig. 6, from 317° to 360° of the cycle.

Disposed immediately above each sensing pin 83 is an associated pendant pin 96, see Fig. 6, each formed with an offset head which serves as a fulcrum about which the pin may rock into and out of alignment with the associated sensing pin 83. Cooperating with each pendant pin 96 is a transmission pin 97 yieldingly mounted to bear on the head of its associated pendant pin to thereby urge the pendant pin to a position aligned with its associated sensing pin. Said transmission pins and pendant pins are suitably supported in a stationary frame or basket comprised of a pair of perforated plates 98 which support the pendant pins 96 and another pair of plates 99 which support the transmission pins 97, all of said plates being mounted on transverse bars 101 which are suitably secured to and between the base frames 11, 13 of the machine. As more fully described as in said patent to Braun, when the sensing pin box is lowered, any sensing pin 83 which aligns with a card perforation passes through said perforation to a position where the upper extremity is clear of the lower extremity of the associated pendant pin 96, thereby enabling such pendant pin to rock into direct alignment with the top of such sensing pin. Thereafter, on the upper movement of the sensing pin box, said pendant pin is moved longitudinally by the associated sensing pin, to cause upward displacement of the associated transmission pin 97. All sensing pins which do not align with card perforations, when the sensing pin box is lowered, are restrained by the imperforate surface of the card in positions wherein the upper extremities do not clear the associated pendant pins, thereby preventing the associated pendant pins from rocking into a direct aligning position therewith, so that, when the sensing pin box is thereafter raised, the pendant pins and transmission pins associated therewith are not longitudinally displaced within their supporting framework.

The usual sensing retract mechanism is provided for erasing the set-up of the pendant pins 96 at the completion of each sensing cycle, said mechanism including a plurality of retract slides 105, one for each column of pendant pins 96, each slide being formed with lugs engaging the associated pins of the column for swinging all the pins of that column to their inclined ineffective position as shown in Fig. 6, against the tension of individual retract slide springs 107. Engaging the rear most end of the retract slides is a retract bail 108. The bail is carried by and between a pair of rock arms 109 secured to a retract shaft 110 suitably journaled in brackets secured to the pendant pin box frame bars 101. Near the right hand end of shaft 110, as seen in Fig. 1, is a rearwardly extending rock arm 111 pivotally joined through an upright link 112, see also Fig. 4, with a follower bellcrank 113. The bellcrank is suitably pivoted near its mid-point to a portion of the machine frame and carries on its forward end a roller 114 engaging a retract cam 115 mounted on the front main drive shaft 25. The high periphery of cam 115, acting through follower 113, link 112, and shaft 110, causes the bail 108 to rock forwardly, urging the slides 106 forwardly against the tension of the individual compression spring 107, to tilt or swing to their ineffective positions, all pendant pins 96 which had been permitted to rock to their straightened effective position during the preceding sensing cycle. Referring to Fig. 14, it will be seen that cam 115 is effective for retracting and releasing the retract bail 108 from 330° to 10° of the following cycle, the pendant pins being fully retracted at about 348° of the cycle, which timing coincides with the descent of the sensing pin box towards the next succeeding master card occurring from 317° to 360° as heretofore described.

The usual pin disabling means are provided for holding the pendant pins retracted throughout each sensing cycle in which there is no card in the sensing chamber, said means, briefly stated, including a no-card pin 116, see Fig. 1, mounted on the left hand side of the reciprocating sensing pin box. As fully described in said patent to Braun, the position of said pin, depending upon whether a card is present in the sensing chamber, acting through a follower lever 117 yieldingly bearing thereon, selectively positions an interponent, not shown herein, beneath a forwardly extending rock arm 118 fast on the retract shaft 110. Said interponent when so positioned blocks the return movement of the retract shaft and retract bail 108, thereby holding all pendant pins 96 in their tilted ineffective position. The presence of a card in the sensing chamber, as detected by said no-card pin 116, prevents said interponent from moving into a blocking relation to said arm 118, thereby permitting the retract bail to rock rearwardly and release the pendant pins from their retracted ineffective positions.

Figure 12:
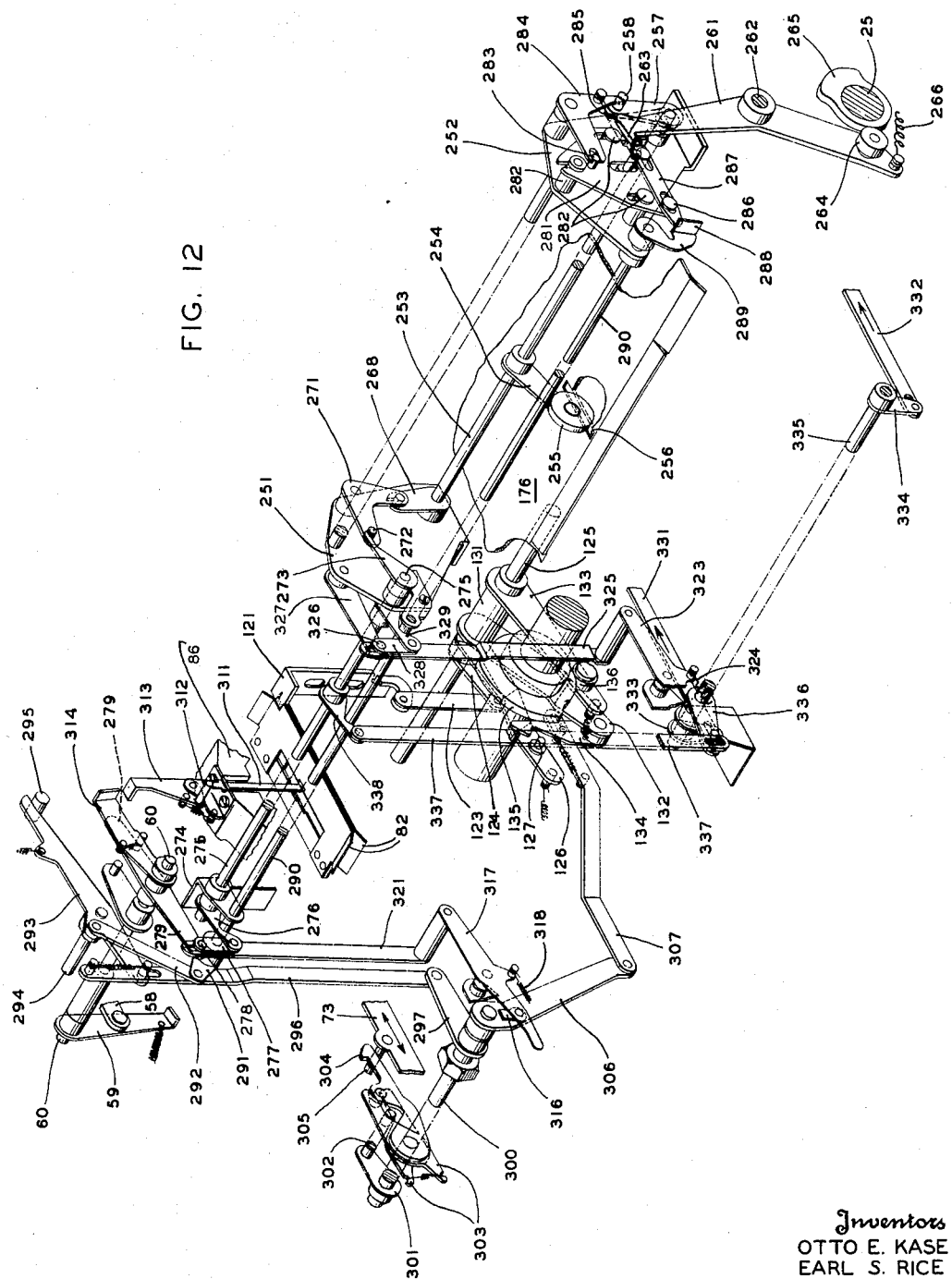
Fig. 12 is an isometric view of certain automatic feed control and machine stopping mechanism.

The master cards are momentarily retained for sensing within the sensing chamber by a pair of card stops 121, one shown in Fig. 6 and Fig. 12, which are slideably mounted on the rearmost sensing chamber support bar 81, and are yieldably urged by springs 122 into effective card blocking position. The lower end of each card stop is connected by a link 123 with a rock arm 124 fast on a rock shaft 125, said shaft being suitably journaled in the base frames 11 and 13. As can also be seen in Fig. 10, the shaft 125 carries fast thereon an arm 126 having a stud 127 at the forward end thereof. Loosely mounted on shaft 125 is a hub 131 to which are secured arms 132, 133, said hub and arms being an integral unit freely rockable on the shaft 125. Pivoted to the forward end of arm 132 is an upright hook 134 disposed in position to engage the stud 127 on arm 126. Secured to arm 133 is a roller 136 disposed for bearing engagement with a card stop cam 135 mounted on the front drive shaft 25, it being understood that suitable springs are provided for maintaining the roller in engagement with the cam. The rotation of cam 135 causes vertical reciprocation each cycle of the hook 134, which, when engaging the pin 127, causes a rocking of shaft 125, which pulls the card stops downwardly to their ineffective or open position. When the hook 134 is swung out of engagement with pin 127, the reciprocal movement thereof about shaft 125 is an idle movement ineffective for pulling the card stops to their open position, whereupon the master card is retained in the sensing chamber for the ensuing cycle. Means hereinafter to be described are provided for moving said hook 134 out of normal engagement with said pin, said means being associated with master card feed disabling mechanism which is actuated in response to a feed failure of the detail records. By referring to Fig. 14, it will be seen that the card stops, in normal machine cycles, are pulled to their lower open position beginning at 66°, being held fully open from 84° to 190°, and are returned to fully closed position by 210° so as to retain in the sensing chamber the next succeeding master card which reaches the card stops at about 225° of the cycle.

Means are also provided for aligning the master cards within the sensing chamber and include a pair of aligning fingers 141 disposed at opposite sides of the sensing chamber, one only shown in Fig. 6, said fingers being pivotally supported on the frame bar 81 in such a manner as to swing inwardly against the two opposite edges of a card and thereby center the card laterally within the sensing chamber. Said aligning fingers constitute the vertical arms of individual bellcranks, the horizontal arms of which project inwardly beneath the sensing chamber and are operatively connected to each other so as to rock in unison into and out of aligning position. The aligners are actuated through an upright link 142, having an open slot engaging a pin 143 formed on an actuating arm 139 having a common pivot with one of said bellcranks and disposed to bear against the horizontal arms of both of said bellcranks. Said link 142, see also Fig. 10, is pivotally connected to a rock arm 144 carried by a hub 146 loosely mounted on shaft 125, said hub also carrying a follower arm 147. Said follower arm 147 is provided with a roller 148 cooperating with a card aligner cam 145, mounted on the front drive shaft 25. As can be seen by reference to Fig. 14, cam 145 is designed to move said aligning fingers from open to closed position from 235° to 265° maintaining said fingers closed until 30° of the following cycle and then moving said fingers to fully open position by 60° of the cycle.

In order to render said aligning fingers effective means are provided for temporarily lifting the sensing chamber pressure rollers 34 off the card so as to free the card for lateral aligning movement within the sensing chamber. As can be seen in Figs. 6 and 10, upright lift arms 151 are provided at opposite sides of the sensing chamber, the left hand arm being shown in Fig. 6, the right hand arm being shown in Fig. 10, the upper extremities of said arms being disposed directly beneath the yieldable supporting structure for the sensing stage pressure rollers 34. Said lift arms are carried by a rock shaft 152 mounted on the sensing chamber supporting frame bar 81. The right hand lift arm 151, see Fig. 10, constitutes one arm of a three armed bellcrank, the other arms of which bellcrank carry a heavy spring 153 and a follower roller 154 respectively. The roller 154 is disposed to bear under tension of spring 153 on a pressure roller lift cam 155 mounted on the front main drive shaft 25. The indented periphery of cam 155 enables the heavy spring 153 to rock shaft 152 clockwise causing the lift arms to raise the yieldingly supported pressure rollers 34 out of contact with the card in the sensing chamber. As seen in Fig. 14, the cam 155 is designed to actuate said pressure rollers from 270° to 300° of the cycle, said rollers being fully raised at about 285°, which time is shortly after the card aligners have been released to engage the card and just prior to the descent of the sensing pin box.

The master cards 65, upon the opening of the sensing chamber card stops, are propelled by the sensing chamber skid rollers 33 to the intermediate master card feed rolls 32 which feed the cards between a pair of suitably supported guide plates 156. The rear master card skid rollers 33 and eject rolls 32 continue the feed of the cards uninterruptedly to an eject pocket 157. Said eject pocket is of the usual box-like construction, shaped to retain the records in a stacked arrangement and including a card stack support tray 158 mounted to yield, from the weight of the cards supported thereon, against the tension of a compression spring 159.

Figure 8:
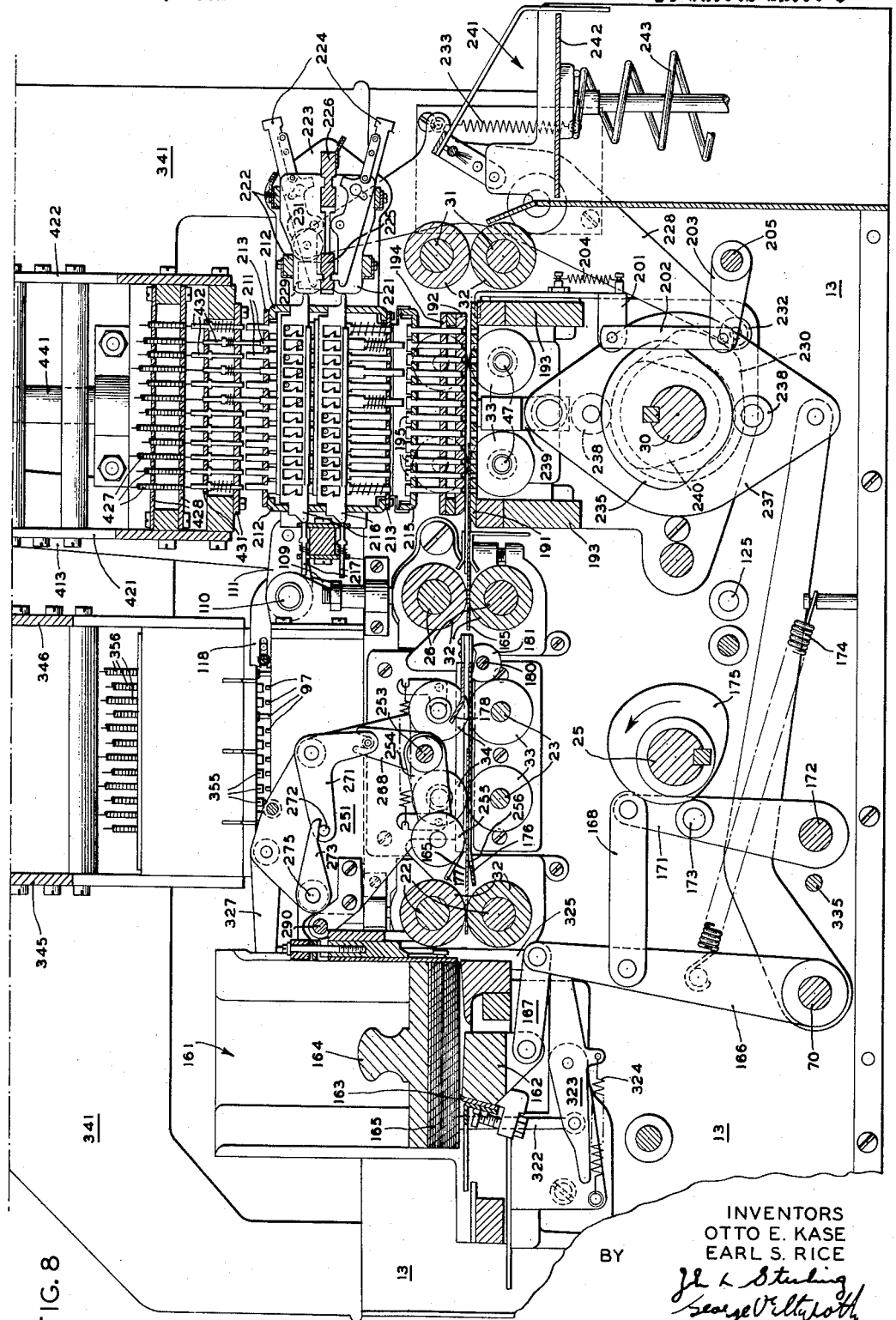
Figure 11:
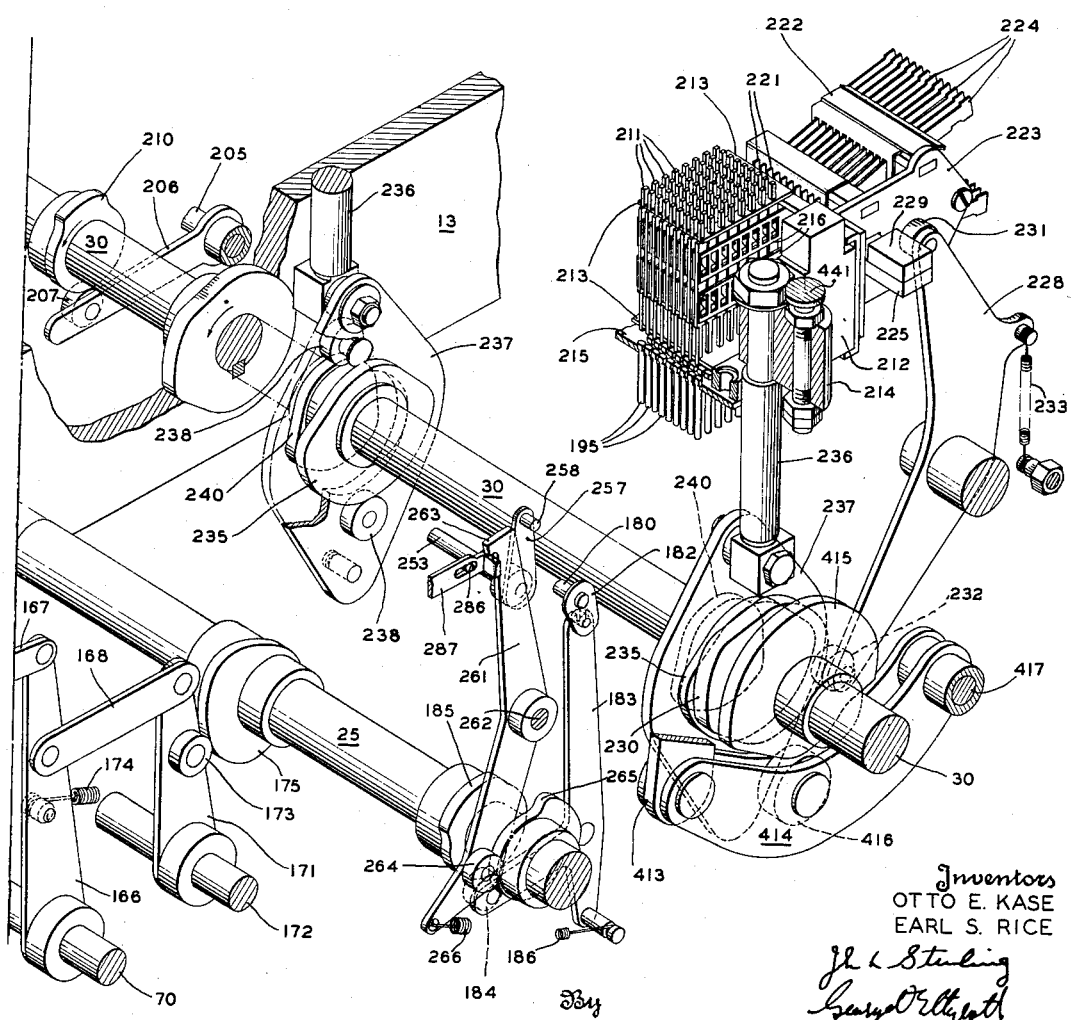

The detail card feeding mechanism is similar to that for the master cards and, as can be seen from Figs. 2, 4, and 8, includes a detail card magazine 161 with which is associated a reciprocating feed block 162 carrying a picker knife 163. In Fig. 2, the detail card magazine is shown in an empty condition while in Fig. 4 it is shown containing a stack of detail cards 165 beneath the usual card weight 164. The detail card feed block and picker knife is reciprocated from a rock arm 166 to which it is pivotally connected by a link 167, said rock arm being loosely mounted on the heretofore described rock shaft 70. The rock arm 166, see also Fig. 11, is connected by a link 168 with a cam follower arm 171 loosely mounted on a rod 172 extending between and supported by the center frame plate 13 and the right hand frame casting 12. A roller 173 on the arm 171 is disposed for bearing engagement with a detail card feed cam 175 mounted on the front main drive shaft 25. A spring 174 connecting the arm 166 with the machine frame urges the roller against the cam. Cam 175 is designed so as to operate the detail card picker mechanism simultaneously with that of the master cards, the separate card feed cams enabling independent operation of the detail card feed mechanism in cycles wherein the master feed card mechanism is disabled by means hereinafter described. By reference to Fig. 14, it will be seen that cam 175 is effective for advancing the detail card picker knife from 40° to 120° and for restoring the picker knife from 120° to 300° of the cycle, the detail card reaching the front detail feed rolls 32 at about 100° of the cycle.

The detail cards 165 are carried by the front detail feed rolls 32 into a position where they are retained in preparation for punching therein, which position will be hereinafter referred to as to the holding stage of the detail card feed mechanism. Said holding stage constitutes a card chamber comprised of a bottom card supporting plate 176 substantially coextensive with the area of the card, above which plate are disposed (see also Fig. 2) a pair of side guides 177 and a rear guide 178, said guides being suitably spaced away from the plate 176 so as to accommodate the thickness of a card fed between said guides and said plate. The bottom plate 176 is suitably secured to the base frames 12 and 13 and is formed with openings therein which align with the associated holding stage skid rollers 33 and pressure rolls 34 to enable contact by the rollers of a card in the holding stage.

The holding stage card chamber is provided with a pair of card stops 181 of modified construction which stops are carried by a card stop shaft 180. Said stops are shaped as rollers having a segment cut out of their periphery so as to provide a limit face disposed for abutting relation to the leading edge of a card in the holding stage card chamber. The shaft 180 is suitably carried at each end thereof by supporting brackets secured to the machine frame and is provided near the right hand end thereof, as seen in Fig. 11, with a rock arm 182. Said rock arm is joined by a pin and slot connection with a cam follower bellcrank 183. Said bellcrank is suitably pivoted to the machine frame and carries a roller 184, on the horizontal arm thereof, cooperating under tension of a spring 186 with a holding stage card stop cam 185 mounted on the front main drive shaft 25. The high periphery of cam 185 acting on roller 184 causes a clockwise rocking of the card stop shaft 180 which movement rocks the limit face of the card stops clear of the feed plane of the detail card, into the position shown in Fig. 8, thereby releasing said card from the holding stage card chamber. As seen by reference to Fig. 14, cam 185 is effective for rocking said stops from closed to open position from 94° to 109° and for returning said stops to closed position from 186° to 210° so as to retain in the holding stage the next succeeding detail card which reaches the holding stage card stops at about 225° of the cycle.

Upon the opening of the holding stage card stops 181, the detail card 165 is propelled by the holding stage skid rollers 33 to the detail card intermediate feed rolls 32 and thence to the punching stage wherein the detail card is retained for receiving a punched perforation pattern in the detail code of the data sensed from the corresponding master card during the time that said detail card was retained in the detail holding stage. The punching mechanism is of similar construction to that shown and described in patent to Braun 2,211,094, issued August 13, 1940, and includes a punch chamber comprised of spaced plates 191 and 192 mounted on a pair of transverse frame bars 193 which extend between and are secured to the center frame plate 13 and the right hand frame casting 12. The punch chamber plates 191, 192, are suitably perforated in positions aligning with and corresponding to each index position of a detail card 165 which, in the present instance, in order to correspond with the two zone ninety column card 165 shown in Fig. 13 requires forty-five columns of twelve perforations each. Plate 191 serves as a die plate and plate 192 as a stripper plate in cooperation with a field of individual punch elements 195 associated therewith, there being a full complement of said punch elements, one for each of said index positions of a detail card. An additional perforated plate 194 secured to the stripper plate 192 acts as an additional guide for the punch elements 195. The column of twelve punch elements 195 shown in sectional views, Figs. 4 and 8, correspond to the index positions of two detail card columns, i. e., as six position upper zone column and the six position lower zone column in direct alignment therewith. The movement of the detail card is arrested in the punch chamber by card stopping mechanism of conventional type similar to that associated with the master card sensing chamber and comprising a pair of card stops 201 slideably mounted on the rearmost punch chamber support bar 193 so as to move from their open position as shown in Fig. 8 to their closed position as shown in Fig. 4. The stops are yieldingly urged upward to their closed position by springs 204 and are connected by links 202 with rock arms 203 fast on a card stop rock shaft 205. The shaft 205 is suitably journaled in the base frames 13 and 12 and carries a cam follower arm 206, see Fig. 11, having a roller 207 cooperatively engaging a card stop cam 210 mounted on the rear main drive shaft 30. The high periphery of cam 210 acting on roller 207 causes a counter-clockwise rocking of the shaft 205 against tension of springs 204 to positively lower the stops to their ineffective open position. Cam 210, as seen by reference to Fig. 14, is designed to lower said stops to their open position starting at 127° and for raising said stops to their effective closed position by 226°, said stops being fully open from 146° to 207° of the cycle.

As fully described in said patent to Braun, 2,211,094, the individual punch elements 195 are selectively rendered effective by means of individual set pins 211, one for each punch element, which pins are selectively set, in the present instance, by the recoding means hereinafter to be described and are locked in position so as to act as a gag for the punch element associated therewith. The set pins are yieldably supported in columns, corresponding to the columns of punch elements, within a reciprocating set pin box. The set pin box is comprised of a pair of transverse frame bars 212, which bars support upper and lower perforated pin guide plates 213. The pin box frame bars 212 are secured at their ends to side castings 214, see also Fig. 2, which castings are vertically reciprocated each cycle by means hereinafter described. Also carried by the frame bars 212 is a perforated plate 215, see Figs. 4 and 8, which underlies the heads of all the punch elements 195 and which acts on the upward movement of the set pin box to raise the punch elements clear of the punch chamber stripping the punched card from the punch elements. It will be noted that the plate 215 is spaced apart from the lower pin guide plate 213 so as to allow sufficient clearance for the locking of a set pin in effective gagging relation to its associated punch element 195.

Selected pins 211 are locked into effective gagging position by locking slides 216, there being one slide for each of the ninety columns of the detail cards, said slides having locking noses formed therein to engage over extrusions on each pin of the column associated therewith. It will be understood that one of the locking slides shown in Figs. 4 and 8 is for the six set pins 211 associated with an upper zone column of the detail card, the other locking slide shown cooperating with the six set pins 211 corresponding to a lower zone column of the detail card. Said locking slides are mounted in the frame bars 212 and are yieldingly urged rearwardly to their effective locking position by suitably supported spring loaded pins 217.

Locking slide retract means of the type shown in said patent to Braun, 2,387,828, are provided and which, as more fully described in said patent, are manually settable to vary the operation of the retract mechanism so as to either retract and release the associated locking slide each machine cycle, to prevent the normal retraction of a locking slide each machine cycle, or to hold an associated slide retracted throughout a machine cycle, which latter function has the effect of disabling the associated punch elements. The retract means comprise a plurality of plates 221, one for each locking slide 216, said plates being arranged in inversely disposed pairs and supported for sliding movement between a plurality of transversely disposed bars 222. Secured to each of said bars is a comb by which the plates are held aligned in abutting relation to their corresponding locking slides 216. The bars 222 are mounted in a pair of brackets 223, which brackets are secured to the rearmost frame bar 212 of the reciprocating set pin box. Pivoted to each plate 221 is a latch 224, each latch having a pair of teeth, one of which teeth is adapted to engage a horizontally reciprocating retract bail 225, the other tooth being adapted to engage a stationary bar 226. The bar 226 is secured fast to the brackets 223, and the bail 225 is slidably mounted in said brackets for horizontal reciprocating movement. The retract bail 225 is reciprocated each cycle through a pair of cam follower levers 228, one disposed near each end of the bail, said levers being pivotally secured to the machine frame. Each of said levers, see also Fig. 11, carries at its upper extremity a roller 231 bearing on a lug 229 secured to the bail 225, and at its lower extremity each lever carries a roller 232 engaging under tension of a spring 233 a retract cam 230 mounted on the rear main drive shaft 30. The high periphery of cam 230 operates through levers 228 to slide the bail 225 forwardly, said bail carrying all retract plates 221 which are hooked therewith so as to retract each associated locking slide to unlocking relation to the associated column of set pins 211. Retraction of said locking slides occurs at a time when the set pin box is in its uppermost raised position.

The set pin box is cyclically reciprocated by a pair of rods 236, each rod connecting one of the pin box side castings 214 to an associated centrally apertured cam follower plate 237. Each plate 237 encompasses the rear drive shaft 30 and carries a pair of rollers 238 cooperating with an associated pair of complementary cams 235, 240 mounted on shaft 30. Each pair of cams 235, 240 acting through the follower plates 237 and rods 236, positively raises and lowers the set pin box each machine cycle, the rising movement of which operates to set the pins 211 selected by means hereinafter described in their lower effective position within the pin box, the lowering of the set pin box operating to actuate the punch elements 195 corresponding to all of said set pins which are locked in their lower effective gagging position. As can be seen by reference to Fig. 14, the complementary cams 235, 240 are designed to raise the set pin box from 83° to 143° and to lower the pin box from 226° to 286°, the punch elements 195 perforating the detail card at about 270° of the cycle.

It will be noted that the pin box is held in its upward raised position for a period coinciding with the retraction and releasing of the locking slides 216 which are operatively connected to the retract bail 225. This timing also coincides with the opening of the punch chamber card stops 201 thereby enabling a previous setup of pins 211 to be erased and a new setup of the pins to be effected before the pin box starts descending to perforate the following card fed into the punch chamber while the pin box is in its raised position. It is, of course, understood that the detail card is punched only by those punch elements 195 associated with set pins 211 which are locked in their lower gagging position just prior to the descent of the pin box. In Fig. 8, showing the parts at about 180° of a cycle at which time the set pin box is fully raised, the second, fourth and sixth set pins from the right are shown in position for engagement with the associated locking slide 216. As the pin box is subsequently lowered, after the pins are locked in the position shown, only the second, fourth, and sixth punch elements from the right will perforate the detail card, the movement of all other punch elements being resisted by the surface of the detail card causing said other punch elements to be displaced upwardly with relation to the pin box and taking up the clearance between the head of the punch element 195 and its association set pin 211.

In the event it is desired to prevent punching in one or more columns, the locking slides 216 for such columns may be disabled by manually setting the latch 224 associated with such column in a position wherein the rear tooth of the latch engages the groove of the stationary disabling bar 226. In this setting of the latch, the locking slide 216 is held in its fully retracted forward position thereby being ineffective for locking any set pin 211 of the associated column in gagging position. When the latches 224 are set in their intermediate position, not engaging the bail 225 or the bar 226, the locking slides associated therewith are not cyclically retracted but are retracted only upon the setting movement of one of the unlocked pins 211 of the same column into its lower gagging position, which movement operates to cam the locking slide for that column to its forward retract position. Accordingly, when the latches 224 are in their intermediate position the setup of the associated column of set pins may be retained for a succession of punching cycles and until a cycle wherein a different one of the pins 211 of the same column is caused to be set in its lower effective gagging position.

Upon completion of a punching cycle and opening of the punch chamber card stops 201, the perforated detail card 165 is fed by the punch chamber skid rollers 33 to the rear detail eject rolls 32 and thence to a detail card eject pocket 241. The detail card eject pocket is similar in construction to the aforementioned master card eject pocket and is provided with a card support tray 242 mounted for yielding movement on a compression spring 243.

Briefly summarizing at this point the operation of the foregoing record handling mechanism of the machine, it will be seen that the machine provides means for feeding record cards from two separate magazines through a succession of feed stages associated with each individual record feed mechanism. For purposes of summarizing, it will be assumed that the machine is in the course of a reproducing operation with both master cards 65 and detail cards 165 stacked in their respective magazines 61, 161, and also disposed along the other feed stages of the two separate feeding mechanisms. Soon after the start of each machine cycle related records of each group are engaged by their picker knives 63, 163, and conveyed to their respective front feed rolls 32. The master cards 65 are conveyed into sensing chamber reaching the sensing chamber card stops 121 at about 225° of the same cycle, i. e., the first machine cycling effecting the particular cards now being discussed. The related detail card 165 is conveyed simultaneously into the detail card holding stage reaching the holding stage card stops 181 also at about 225° of the first cycle. Near the end of said first cycle the sensing pin box descends and at the completion of the first cycle the master card 165 is still in the sensing chamber with the sensing pin box fully lowered, at which time the related detail card 165 is being retained in the detail card holding stage.

At the beginning of the second cycle the sensing pin box rises to transmit data sensed from the master card to the recording unit of the machine, hereinafter described, the pin box being fully raised by 43° of the second cycle and remaining raised until near the end of said second cycle. At about 66° of said second cycle the sensing chamber card stops 121 start to open to release the master card which is thereupon conveyed by the intermediate and eject feed rolls without interruption to the master card eject pockets 157. At about 94° of said second cycle the detail holding stage card stops 181 start to open to release the detail card which is conveyed to the detail punch chamber during the middle of said second cycle reaching the punch chamber card stops 201 at about 226 of said second cycle. Also during the middle of the second cycle the punch set pin box is raised to receive a setup from the recoding unit in accordance with the data which was sensed from the related master card and transmitted to said recoding unit early in the second cycle. Simultaneously with the detail card reaching the punch chamber card stops at 226° of the second cycle, the punch set pin box starts to descend to perforate the detail card with the recoded pattern perforation of the data sensed from the related master card, which punching is effected at about 270° of the second cycle. At the end of the second cycle the master card 65 has been fed to its eject pocket 157 and the related detail card is retained in the punch chamber, said detail card having been punched but the punch elements not yet stripped from the card. It is, of course, understood that at the completion of the second cycle a second related pair of master and detail cards 65, 165, have been fed from their magazines to their same positions hereinabove described as reached by the first pair of cards at the completion of the first cycle, i. e., the master card sensing chamber and the detail card holding stage respectively. At about 83° of the third cycle, the punch set pin box begins to rise stripping the punch elements 195 clear of the punch chamber by 131° at which time the punch chamber card stops 201 are being opened to enable the punched detail card to feed out of the punch chamber during the middle of said third cycle to the detail card eject rolls 32 and thence to the detail eject pocket 241.

Associated with the detail card holding stage is a mechanism for detecting the presence of a card in the holding stage, which mechanism is operative upon the absence of a card in the holding stage for disabling the feed of the master cards and for automatically stopping the machine. The provision of a holding stage with such control mechanism prevents the mismatching of related and master detail cards which might otherwise result from a failure of the detail feed mechanism since it provides a control of the master card feed in sufficient time to prevent the escape from the sensing chamber of the master card corresponding to the detail card which failed to reach the detail holding stage. In such an event the control mechanism operates to retain a master card in the sensing chamber for repeated sensing thereof for one or more sensing cycles and until a sensing cycle wherein the detail card, corresponding to said master card, is detected within the detail holding stage. In addition to the machine control means associated with the detail holding stage, other automatic machine stop devices are associated with other stages of the separate feeding mechanisms so as to cause an automatic machine stop upon exhaustion of cards from either of the feed magazines 61, 161, upon filling of either of the separate eject pockets 157, 241, or upon a no-card condition occurring in the master card sensing chamber during any sensing cycle.

The control mechanism associated with the detail card holding stage can best be seen in Fig. 12, said mechanism being in part supported by a pair of upright brackets 251, 252, secured to opposite sides of the holding stage card chamber plate 176. Mounted in said brackets is a rock shaft 253 carrying near the middle thereof a rock arm 254 on which is mounted a sensing roller 255. The roller is disposed in vertical alignment with a slot 256 formed in the holding stage chamber plate 176, said slot accommodating said roller when rocked to its lowest limit of movement which is the position thereof shown in Fig. 12. The roller is rocked each machine cycle to detect the presence of a detail card which, when in the holding stage, rests on the plate 176 covering said slot 256. A detail card when in the holding stage prevents the roller from dropping into said slot and instead holds the roller in an intermediate position. Rocking movement is imparted to the roller through an upright rock arm 257 secured to the right hand end of shaft 253, said arm having a stud 258 disposed for engagement by a lever 261 pivoted to the machine frame at 262. The upper extremity of said lever is formed with a forwardly projecting nose 263, for purposes hereinafter described, and the lower extremity of the lever carries a follower roller 264 bearing on a holding stage control cam 265 under tension of a spring 266. Said cam is mounted on the front main drive shaft 25 and acts each cycle to positively rock the lever 261 clockwise into engagement with stud 258 causing clockwise rocking of the shaft 253 and consequent raising of the sensing roller 255 out of the slot 256 or above the surface of a card, as the case may be, to its upper limit of movement. Spring urged means, hereinafter described, provide a yielding counter-clockwise torque to the shaft 253 so that when the lever 261 rocks counter-clockwise to the position shown in Fig. 12, the sensing roller 255 will be yieldingly lowered to either of two positions depending on the presence of a card in the holding stage. Fig. 8 shows the intermediate position of the sensing roller 255 when bearing on a card in the holding stage, and Figs. 4 and 12, show the low limit position of the roller upon detecting no card in the holding stage.

Secured to the left hand end of the rock shaft 253 is a rock arm 268 engaging by a pin and slot connection the vertical arm of a bell crank 271 pivoted on the bracket 251. The horizontal arm of the bell crank carries a stud 272 underlying a rearwardly extending rock arm 273 fast on the right hand end of a rock shaft 275, said shaft being mounted at the right hand end thereof in the bracket 251 and at the left hand end thereof in a bracket 274 secured to the frame 101, not shown in Fig. 12, of the master card pendant pin box. Secured to the left hand end of shaft 275 is a rock arm 276 connected by a short link 277 to a stud 278 carried by a lever 279 which is secured fast to rock shaft 60. The shaft 60, as heretofore mentioned in connection with the machine start-stop mechanism, when rocked in a counter-clockwise direction acts through arm 59 to shift rearwardly a stepped interponent 58, see also Fig. 10, to a position wherein the step of the interponent cooperates with a push rod 57 cyclically reciprocated under control of the machine stop cam 55 to cause an automatic stopping of the machine at the completion of the cycle in which the shaft 60 is so rocked. From the foregoing it will be apparent that when there is no card in the detail card holding stage, the movement of the sensing roller 255 to its lowest limit position within the slot 256, is transmitted through the shaft 253, bell crank 271, arm 273, and shaft 275, to rock the shaft 60 counter-clockwise and thereby effect an automatic stopping of the machine. As can be seen by reference to Fig. 14, cam 265 is designed to positively raise the sensing roller 255 from 81° to 105° and release the roller from 170° to 210°, said roller yieldingly engaging a card at about 181° of the cycle. As heretofore mentioned the detail card, when normally feeding, is at the middle of a cycle, being conveyed from the detail magazine to the holding stage, and at 181° is sufficiently advanced to completely cover the slot 256 in the holding stage card chamber plate 176. Fig. 8 shows the approximate position of the detail card at 180° of the cycle, wherein it will be seen that the card is approximately centered under the roller 255 which roller rides on the card as the card continues to advance through the holding stage. When the parts are moved to the position shown in Fig. 8, with the roller riding on the detail card, the shaft 275 is not rocked counter-clockwise since the connection between the stud 272 and rock arm 273 is such as to allow a limited amount of lost motion therebetween as the sensing roller drops from its upper position to its intermediate position as shown in Fig. 8. However, the continued lowering movement of the sensing roller from the intermediate position to its low limit position, as shown in Figs. 4 and 12, when there is no card feeding to the holding stage, is effective for rocking shaft 275 counter-clockwise to cause an automatic machine stop, said continued movement of the sensing roller occurring from 181° to 210° of the cycle. Accordingly it will be seen that in a cycle wherein a detail card fails to feed to the detail holding stage, the operation of the sensing roller 255 will cause a stopping of the machine at the completion of the same cycle, at which time the master card corresponding to the detail card which failed to reach the holding stage, is retained within the master card sensing chamber.

Upon restarting the machine after an automatic machine stop resulting from the failure of a detail card to reach the holding stage, unless provision were otherwise made, the first cycle of operation would feed the corresponding master card out of the master card sensing chamber. However, since the corresponding detail card had failed to reach the detail holding stage in the preceding cycle, there would be no card in the detail punch stage for receiving the data from the master card so released, thereby resulting in the failure to reproduce said master card. For this reason means under control of the holding stage sensing roller are provided for also disabling the feed of master cards so as to prevent the escape of the master card corresponding to the detail card which failed to reach the holding stage. Said feed disabling means includes a shiftable plate 281 mounted for vertical movement on posts 282 secured to the right hand bracket 252 for the holding stage control mechanism. A stud 283 on said plate cooperates with a slot formed in the horizontal arm of a bell crank 284 pivotally mounted on said bracket 252. The vertical arm of said bell crank is disposed for engagement with the stud 258 on rock arm 257. The ball crank is tensioned clockwise by a spring 285 which yieldingly urges the plate 281 to its uppermost position and also, through stud 258, urges the sensing roller 255 to its lower position. The stud serves to limit the clockwise rocking of the bell crank when there is a card in the holding stage as detected by the sensing roller 255 in the manner heretofore described. Slideably mounted on said plate 281, by studs 286, is an interponent 287 formed with a bent-over ear disposed for engagement by the nose 263 formed at the upper extremity of the heretofore described follower lever 261. The relation of the parts is such that when the plate is permitted to rise to its uppermost position, that shown in Fig. 12, the ear of interponent 287 is aligned horizontally with the nose 263 of the lever 261, but when the interponent is retained in its lower position, that shown in Fig. 11, the ear of the interponent is below and clear of the nose 263. Accordingly, the lever 261 when rocked clockwise to raise the sensing roller 255 also, through bell crank 284, positively moves the plate 281 downward to its lower position. On the return counter-clockwise rocking of lever 261, if a card is detected in the holding stage, the stud 258 will be held in a position blocking the full clockwise rocking of bell crank 284 and thereby preventing the plate 281 from rising to its upper effective position. In such event, the continued counter-clockwise rocking of lever 261, to the position shown in Fig. 11, is ineffective for moving the interponent 287. However, if there is no card in the holding stage, stud 258 permits a full clockwise rocking of bell crank 284 to raise the plate 281 to its upper effective position wherein the interponent 287 is engaged and moved forwardly, by the nose 263 of lever 261, to the position shown in Fig. 12.

Disposed for bearing engagement by the interponent 287 is an ear 288 formed on a rock arm 289 secured to one end of a rock shaft 290. Said shaft is suitably mounted in the brackets 252, 251, 274, and carries at its opposite end a rock arm 291 pivotally connected by a link 292 with a three-armed bell crank 293. Said bell crank is mounted on a pivot stud 94, on the left hand base frame casting 11, see also Fig. 1, the rearwardly extending arm of said bell crank cooperating with a limit stud 295, the forwardly extending arm of said bell crank being joined by a yieldable pin and slot connection with an upright link 296. The lower end of said link is connected to a rock arm 297 fast on a feed disabling rock shaft 300. Shaft 300 is suitably journaled in the left hand base frame casting 11 (said shaft corresponding in function to the shaft 153 of said Patent to Braun 2,387,828). Secured to the left hand end of said shaft is an arm 301 carrying a pin 302 extending between the opposed arms of a scissors clamp 303, which clamp yieldingly engages a latch 304 cooperating with a stud 305, the scissors clamp 303 and latch 304 being loosely mounted on the rock shaft 300. The stud 305 is carried by the master card feed actuating link 73 which, as heretofore described, is reciprocated by the master card feed cam 75, see Fig. 10, to actuate the picker mechanism for the master cards. The arrangement is such that the latch 304 yieldingly follows the rocking movement of pin 302 so that when the shaft 300 is rocked counter-clockwise the latch 304 rises to a position where it can engage the stud 305 when returned by the card feed cam to its position at the start of a feeding operation.

Also secured to the rock shaft 300 is an arm 306, see Figs. 6 and 12, pivotally connected to the forward end of a link 307. The rearward end of said link is joined by a yieldable pin and slot connection with the hook 134 which, as heretofore described, is reciprocated each cycle by the sensing chamber card stop cam 135 and normally engages a pin 127 to open the sensing chamber card stops 121. Counter-clockwise rocking of shaft 300 is effective through the arm 306 and link 307 to swing the hook 134 rearwardly out of engagement with pin 127, the position shown in Fig. 12, thereby disabling the normal operation of the sensing chamber card stops to retain the master card in the sensing chamber for an additional sensing cycle.

By reference to Fig. 14, it will be seen that the holding stage control cam 265 operates to release the lever 261 to its full limit of counter-clockwise movement by 210° of the cycle and restore said lever in a clockwise direction starting at about 81° of the following cycle. When the machine is automatically stopped by the machine stop cam at about 360° of the cycle as a result of there being no card in the detail holding stage, the shaft 300 is in its counter-clockwise rocked position, as shown in Fig. 12, with the feed disabling hook 304 engaged behind stud 305 and with the card stop disabling hook 134 disengaged from the pin 127. In the first cycle of operation after the restarting of the machine, the master card picker mechanism which normally starts advancing a card from the master card magazine at about 40° is disabled by the hook 304 and the sensing chamber card stops 121 which would normally start to open at about 66° are disabled in their closed position through the inoperativeness of the hook 134. Accordingly, under such conditions, the master card which was in the sensing chamber when the machine was automatically stopped is retained in the sensing chamber for a repeat sensing thereof, thereby providing an extra feed cycle wherein the corresponding detail card may be fed to the detail holding stage.

The additional automatic machine stop devices associated with the other stages of the feed mechanisms, as heretofore mentioned, are of a conventional type and include a master card sensing chamber no-card pin 311, see Fig. 12, carried by the frame casting 86 of the reciprocating sensing pin box, said no-card pin cooperating with a stud 312 formed on an upright interponent 313 pivoted to the frame casting 86, said interponent being yieldingly tensioned to bear through stud 312 on the pin 311. The interponent 313 is formed with a bent-over ear disposed for engaging an ear formed on a rock arm 314. The arm 314 is loosely mounted on the automatic machine stop shaft 60 and is yieldingly connected by a suitable spring and limit stud with the lever 279 which, as heretofore described, is fast on the shaft 60. The arrangement is such that on the upward movement of the sensing pin box, if there is no card in the sensing chamber, the interponent will retain its upright position, as shown in Fig. 12, so as to bear on arm 314 thereby rocking lever 279 and shaft 60 counter-clockwise to effect an automatic machine stop. If, however, there is a card in the sensing chamber, the pin 311 yieldingly bearing on the card will be displaced upwardly within the sensing pin box, rocking interponent 313 clockwise so as to clear the arm 314 as the pin box is being raised.

The automatic machine stop mechanism associated with the master card feed magazine 61, see also Fig. 6, includes a no-card pin 316 carried by a lever 317 pivoted to the machine frame below the magazine, said lever being clockwise tensioned by a spring 318 to urge the pin into bearing engagement with the bottom master card 65 within the magazine. The rearward end of lever 317 is connected to the lower end of a link 321, the upper end of the link having a slot engaging the stud 278 on lever 279 which is fast on the shaft 60. The arrangement is such that when the master card magazine becomes exhausted, the pin 316 is free to rise thereby rocking lever 317 clockwise which movement, through link 321, rocks lever 279 and shaft 60 counter-clockwise to cause, as heretofore described, an automatic stopping of the machine. Similar mechanism is provided for the detail card magazine 161 which, as can be seen in Figs. 4 and 12, includes a no-card pin 322 carried by a lever 323 tensioned by spring 324, said lever being connected to an upright link 325. The rocking movement of lever 323 is transmitted to the shaft 60 through rock shaft 275. As best seen in Fig. 12, link 325 at its upper extremity has a slot engaging a stud 326 formed on a rock arm 327 pivoted to bracket 251. A short link 328 connects said stud 326 with another rock arm 329 fast on the shaft 275. Exhaustion of detail cards from the detail magazine enables lever 323 to rock clockwise, which movement, through link 325, rocks the two arms 327, 329, thereby rocking shaft 275 counter-clockwise. As heretofore described, counter-clockwise rocking of shaft 275 is carried through rock arm 276, link 277 and lever 279 to rock the shaft 60 counter-clockwise thereby causing an automatic stopping of the machine.

The automatic machine stop mechanism associated with the eject pockets is partially shown in Fig. 12, and includes a link 331 associated with the master card eject pocket and a link 332 associated with the detail card eject pocket. Each of said links is spring urged rearwardly by means, not shown, and are normally retained in their forward position by an associated trip mechanism, also not shown herein, mounted in the respective eject pockets. Said trip mechanisms are so disposed as to be actuated by the card support trays of the respective pockets as the tray reaches a full pocket position, at which time the associated link 331 or 332 is released for rearward movement. Each of the links 331, 332 is connected at its forward end to a rock arm 333, 334 respectively, carried by a rock shaft 335. Also carried by the shaft 335 is an arm 336 connected by a link 337 with a rock arm 338 fast on the rock shaft 275. The arrangement is such that whenever the card support tray of either pocket is depressed by the weight of cards thereon to a full pocket position, the trip mechanism associated therewith will release the associated one of the spring urged links 331, 332 rocking the shafts 335 and 275 causing similar rocking of the automatic machine stop shaft 60. Cam actuated means, not shown, are provided for restoring the links 331, 332 and associated trip mechanism to their normal position in the first machine cycle after the removal of the cards from the respective one of the full pockets.

From the foregoing description of the various automatic machine stop devices, it will be apparent that the machine will stop automatically upon the occurrence of any one of the following conditions, i. e., exhaustion of records from either one of the feed magazines 61, 161, filling of either one of the eject pockets 157, 241, the absence of a master card in the master card sensing stage, and the absence of a detail card in the detail card holding stage, the last mentioned condition in addition to causing a machine stop also operating to disable the master card feed mechanism on the first cycle following the automatic machine stop, thereby enabling the no-card condition in the holding stage to be corrected without loss of the corresponding master card from the sensing stage.

The recoding unit of the machine by which the data sensed in the master card is converted from a pattern representation in the master code to a pattern representation in the detail code, is located in the head of the machine and is operatively connected with the master card sensing mechanism by means of a wiring unit, the lower end of which wiring unit is disposed immediately above the heretofore described pendant pin box of the master card sensing mechanism.

Figure 5:
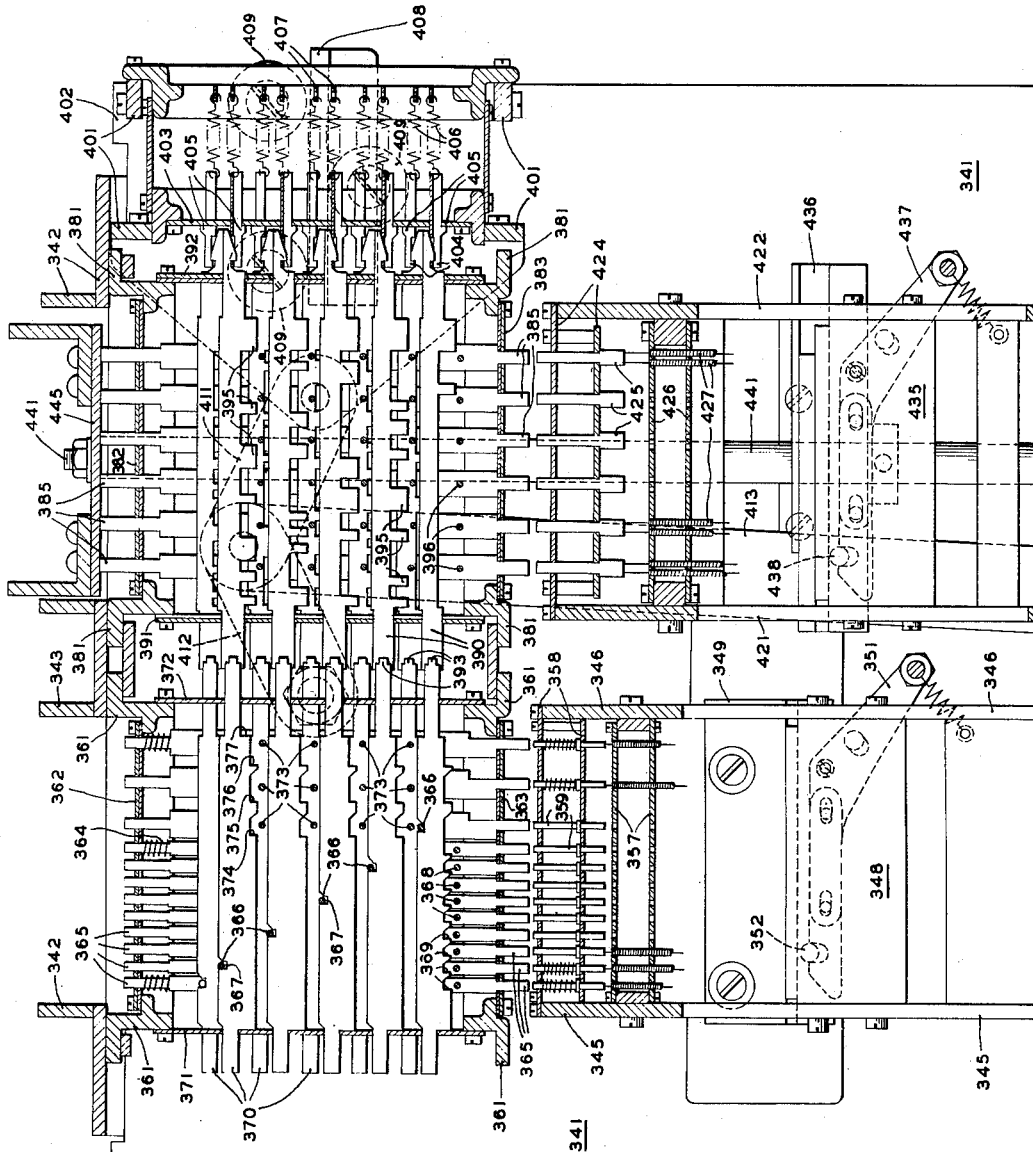

The head portion of the machine is supported between a pair of upper side frame castings similar to those shown in said patent to Braun 2,387,828. The left hand upper frame casting 341, see Figs. 5 and 6, is secured to and extends upwardly from its associated base frame casting 11. The right hand upper frame casting, not shown, corresponds in shape and construction to the left hand casting 341 and is similarly secured to the corresponding right hand base frame casting 12. The upper extremities of the side frame castings are joined in the front and rear by transversely extending angle bars 342 and in the center by a U-shaped bar 343, which bars serve to reinforce the head framework and to provide supporting means for the recoding unit of the machine.

The wiring unit associated with the master card sensing mechanism is of conventional construction and, as seen in Figs. 3, 4, 5, and 6, is comprised of an open box-like frame consisting of front and rear plates 345, 346 respectively, rigidly connected by an X-shaped frame support member 347. Said wiring unit frame, if viewed from the front of the machine, would give a fan shaped appearance since the bottom area of said unit conforms substantially to the dimensions of the master card sensing mechanism while the top area of the unit extends laterally across substantially the entire width of the machine. Secured to each side of the wiring unit frame is a mounting bar 348 having a tongue disposed to ride in a horizontally extending groove formed in a mounting block 349 secured to the upper machine side frame castings 341, thereby providing means whereby the wiring unit may readily be removed from or inserted in the machine. A spring urged latch 351 mounted on the frame on the wiring unit and cooperating with a stud 352 on the mounting block 349 serves to lock the wiring unit in its proper fixed position within the machine.

Secured to the lower portion of the wiring unit frame are two pairs of spaced apart plates 353, 354, respectively. Plates 353 support a field of lower wiring unit pins 355, of which there is one for each transmission pin 97 of the master card sensing mechanism, and plates 354 mount the lower ends of Bowden wires 356 of which there is one for each of the pins 355. A similar arrangement of plates and pins is provided at the upper portion of the wiring unit frame, a pair of plates 357 mounting the upper ends of the Bowden wires 356 and a pair of plates 358 supporting a field of upper wiring unit pins 359. It will be understood that the upper and lower pins 355, 359 are arranged in columns corresponding to the columnar arrangement of master card index positions, with related pins of each group operatively interconnected by one of the Bowden wires 356 so that the sensing of a perforation in any particular index position of a master card column will cause upward displacement of a related one of the upper pins 359 within the corresponding column of said pins 359.

The recoding unit of the machine is contained within a sub-framework constructed in two separate pin supporting sections, one directly associated with the master card sensing mechanism and the other directly associated with the detail card punch mechanism. The section directly associated with the master card sensing mechanism includes four transverse angle bars 361, arranged in a framework, the upper two of said bars being secured to the machine frame supports 342, 343 respectively. Secured to the upper two bars 361 is a horizontally disposed pin guide plate 362. A similar pin guide plate 363 is secured to the lower two bars 361. The plates 362, 363 support and guide a field of pins 365 which are arranged in columns of twelve corresponding to the columnar arrangement of index positions of the master card, there being one column of said pins 365 for each corresponding column of said master card. The lower ends of said pins are disposed directly above the upper wiring unit pins 359 so that upward displacement of any pin 359 by operation of the master card sensing mechanism will raise the corresponding pin 365 against tension of individual compression springs 364 associated therewith.

Figure 3:
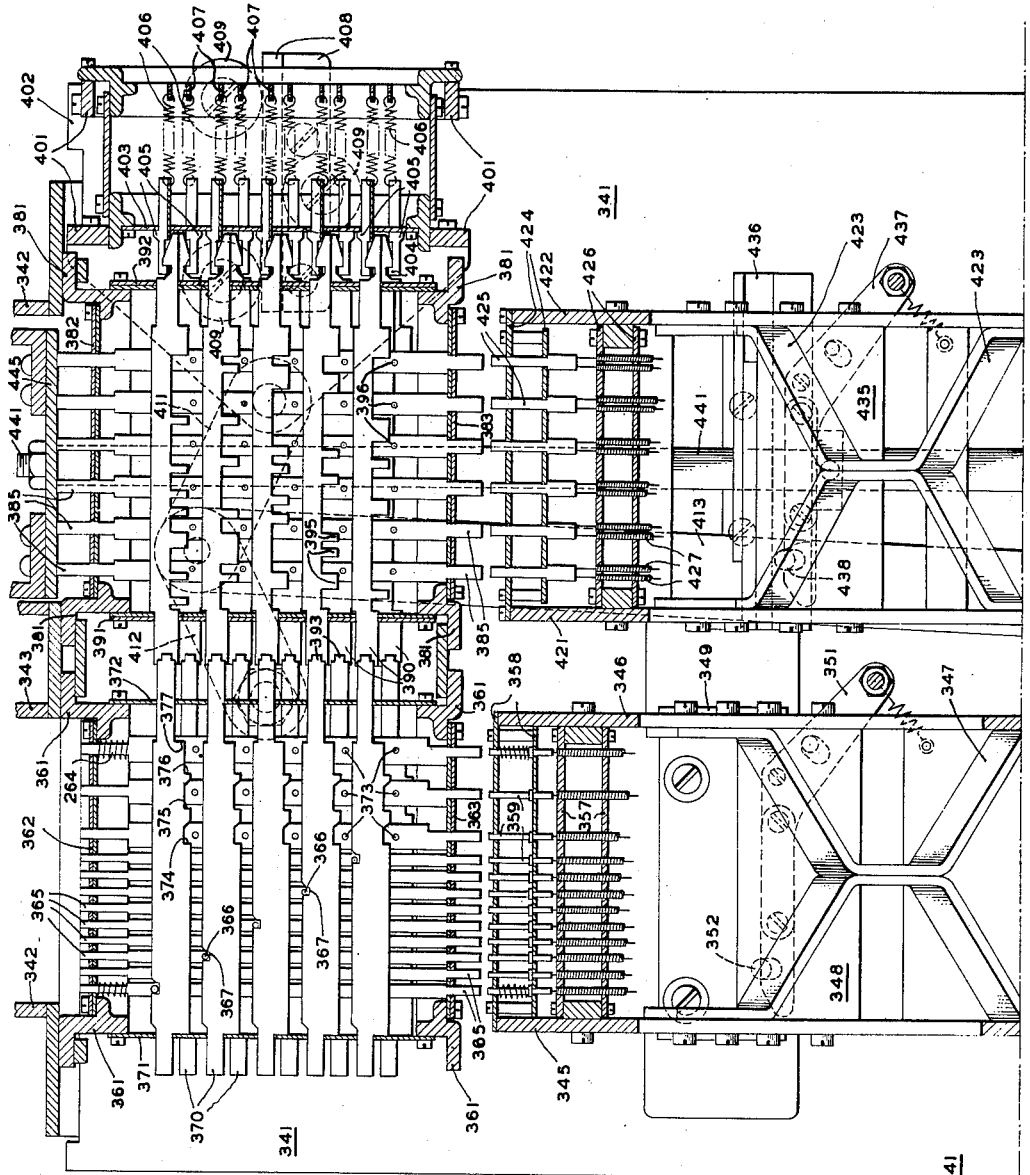
Figure 9:
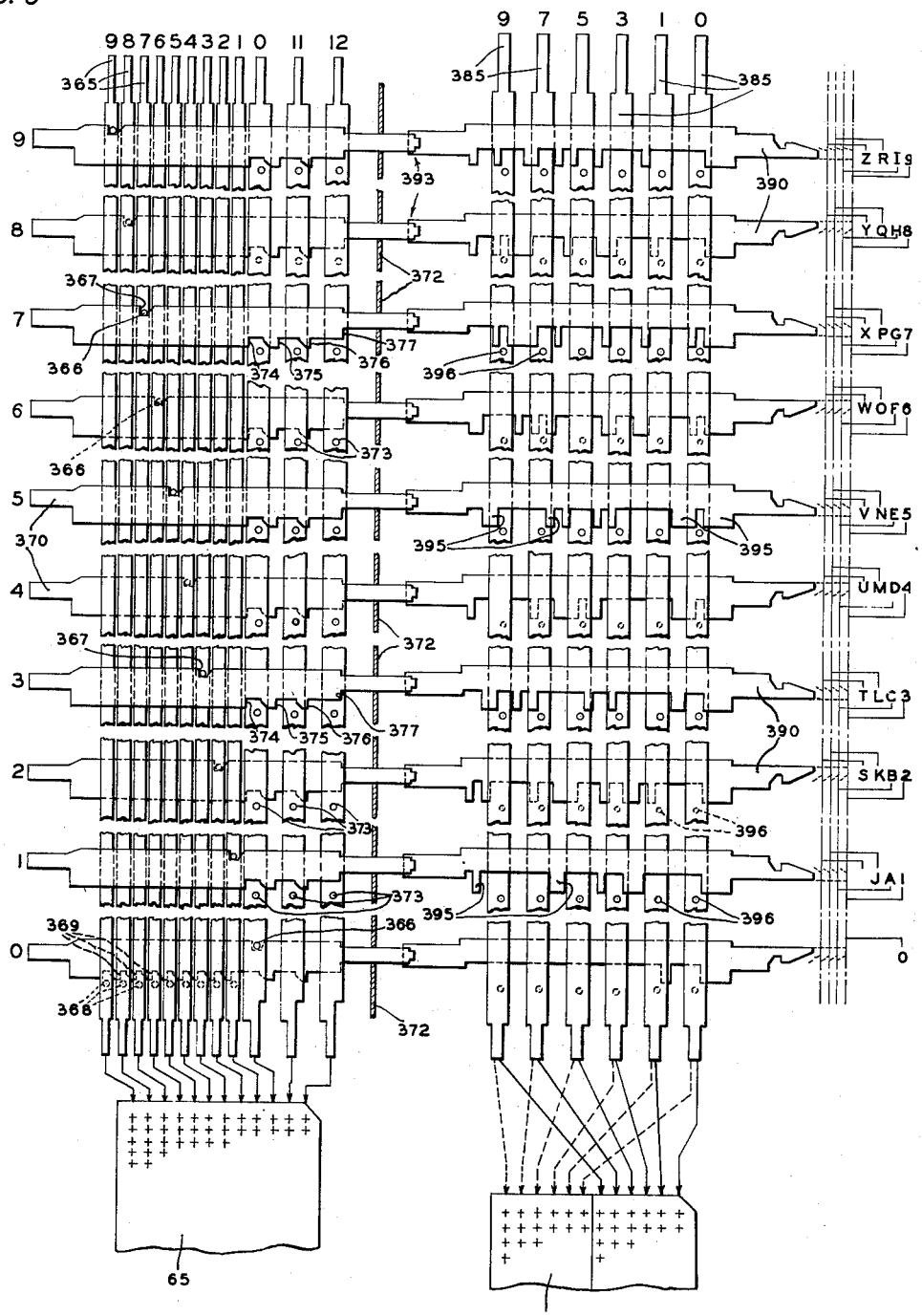

Associated with each column of said pins 365 is a group of differentially settable slides 370 supported for horizontal sliding movement in front and rear perforated plates 371, 372, respectively, said plates being secured to the recoding unit frame bars 361. The slides 370 are arranged in vertical banks of ten slides each, there being one bank cooperating with each column of pins 365. For the sake of compactness, alternate slides 370 of each bank are disposed on opposite sides of its associated column of pins 365, the sectional view of Fig. 3 showing in full the five slides disposed on the right hand side of an associated column of pins 365, the sectional view of Fig. 5 showing in full the five slides disposed on the left hand side of the associated column of pins. The schematic view of Fig. 9 shows the parts exploded in a vertical direction in order that each of the ten slides of a bank can be seen in one view with greater clarity.

Figure 13:
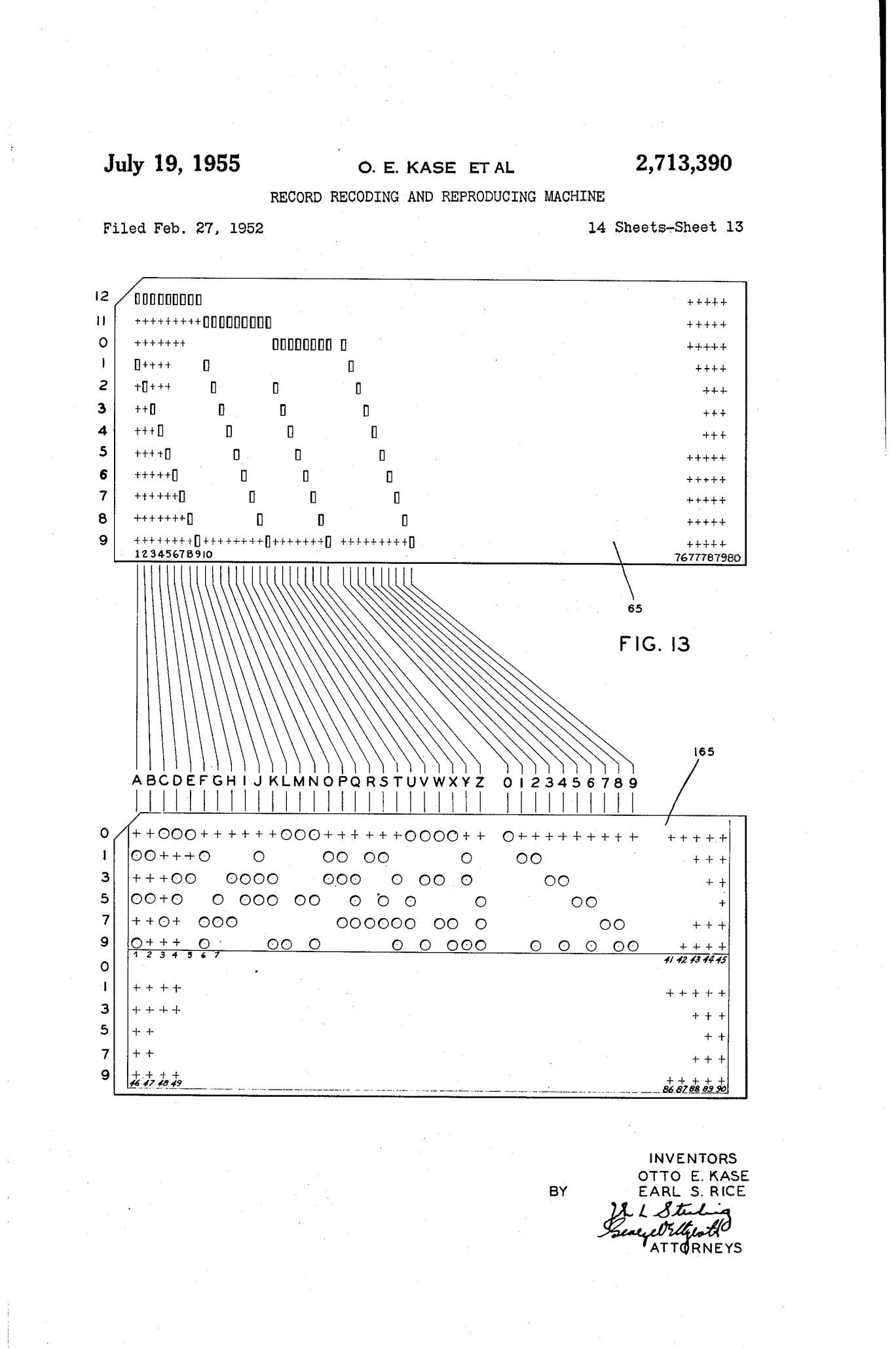

It should be understood that the relation of each column of pins 365 with the index positions of the corresponding master card column is such that the pins 365 of each column, reading from left to right, are controlled by separate index positions running from the bottom to the top of a corresponding column of the master card 165. As can be seen in Fig. 13, the top three index positions of a master card column are designated the "12," "11," and "0" positions, respectively, the bottom nine positions of a column being designated the "1" through "9" positions, respectively. In Fig. 9, the pins 365 of a column are numbered at the top thereof to indicate the respective master card index positions from which they are controlled.

Each of the pins 365 controlled by the "9" through "0" index positions, i. e., the ten left hand pins of the column, are provided with a stud 366 normally engaging a notch 367 formed in the upper edge of a related one of the slides 370. In Fig. 9 each slide 370 of a bank is also numbered at the left hand end thereof to indicate the particular pin 365 of the associated column with which it directly cooperates. Each of the nine pins 365 controlled by the "9" through "1" index positions, the nine left hand pins of a column, are also provided with a stud 368 disposed to engage with but normally disengaged from teeth 369 formed in the bottom edge of the lowermost or "0" slide of the bank. From the foregoing, it will be seen that the raising of any one of said ten left hand pins 365 will enable the release, by means hereinafter described, of the related one of the slides 370 for rearward movement, to the right in Fig. 9, the raising of any one of said pins, except for the "0" pin, also blocking the release of the "0" slide 370.

The three right hand pins 365 of a column, i. e., the pins controlled by the "0," "11" and "12" index positions of the master card, are each provided with a plurality of limit studs 373, each of said three pins having a stud 373 cooperating with each of the uppermost nine slides 370, i. e., the nine slides released under control of the "9" through "1" index positions. The bottom edge of each of said slides 370 is cut away to form a series of differentially spaced limit shoulders 374, 375, 376, 377, which shoulders in cooperation with the studs 373 determine different limit positions for any slide released as aforementioned by one of the line left hand pins 365. In the event neither one of the three pins 365 controlled by the "0", "11," "12" index positions is raised during a sensing cycle, any slide 370 which may be released in said cycle is free to travel a full extent to a position wherein the shoulder 377 abuts against the slide supporting guide plate 372. In the event the pin 365 controlled by the "0" index position is raised in any sensing cycle, any one of the slides 370, other than the "0" slide, which may be released in said cycle will be limited by one of the studs 373 on the "0" pin 365 engaging the limit shoulder 374 of said released slide so as to block the release of the slide in a position representing one-fourth of its full extent of travel. In the event the pin 365 controlled by the "11" index position is raised, any slide 370 released in said cycle will be limited by a stud 373 on said "11" pin engaging the limit shoulder 375 to arrest the slide at one-half its full extent of travel. In the event the pin 365 controlled by the "12" index position of a card column is raised, any slide 370 released will be limited by a stud 373 on said "12" pin 365 engaging the limit shoulder 376 of the slide to arrest the travel of the slide at three-fourths of its full extent of travel. Accordingly, each slide 370, when released by the raising of one of the nine left hand pins 365, controlled by the "9" through "1" master card index positions, is differentially limited in either one of four possible positions depending on whether any one, and if so, which one of the three left hand pins 365 controlled by the "0," "11," "12" card index positions is raised concurrently therewith.

The separate pin supporting section of the recoding unit which is directly associated with the detail card punch mechanism is supported by transverse frame bars 381, the upper two bars being secured to the machine frame supports 343, 342, respectively. Secured to the upper two bars 381 is a pin guide plate 382, and a similar guide plate 383 secured to the lower two bars 381. Said plates support a field of punch selecting pins 385 which are provided with limit shoulders near each end so as to enable a limited extent of vertical displacement of each pin between the plates 382, 383. Said pins 385, as distinguished from the releasing pins 365, are arranged in columns of six pins each, thereby corresponding to the columnar arrangement of index positions of the detail card. As seen in Fig. 13, the detail card index positions are designated "0," "1," "3," "5," "7," "9" from top to bottom of a card column. In Fig. 9, the pins 385 are numbered to indicate the particular detail card index position to which they correspond. Cooperating with each column of pins 385 is a bank of ten slides 390 supported for horizontal sliding movement in plates 391, 392, respectively, secured to the upper and lower transverse frame bars 381. Alternate slides 390 of each bank are disposed on opposite sides of the associated column of pins 385 in a manner similar to the relation of slides 370 to pins 365. Each slide 390 is positively joined to a related one of the slides 370 by means of a closely fitted tongue and slot connection 393, the related slides so connected functioning as a unitary recoding slide but constructed in the two sections 370–390 in order to facilitate assembly of the recoding unit. The bottom edge of each recoding slide section 390 is cut away to provide gagging shoulders 395 of various widths and disposed at various predetermined positions on each slide, which shoulders, when the slide is released to one of its differential settings, cooperate with studs 396 formed on each of the pins 385 to gag, i. e., prevent vertical displacement of one or more of the pins 385 thus selected in accordance with the differential setting of the released slide. In the normal unreleased position of the recoding slide 370–390, the position shown in Figs. 3, 5, and 9, the shoulders 395 are clear of all studs 396 enabling vertical displacement of each of the six pins 385 of a column.

A reciprocating carriage is provided for yieldably releasing and positively restoring said recoding slides, said carriage having a frame comprised of transverse bars 401 secured at each end thereof to carriage frame plates 402, one shown in Figs. 3 and 5. Secured to the two front carriage frame bars 401 is a vertically disposed plate 403 in which are mounted a plurality of slide actuating hooks 404, one for each recoding slide 370—390, each hook engaging a notch formed in the rearmost end of the slide. The hooks 404 are formed with rectangular shanks fitted into correspondingly shaped openings in the plate 403 and also have limit shoulders 405. Said shoulders yieldably abut the plate 403 under tension of individual springs 406 connecting each hook to an anchor plate 407 secured to the carriage frame bars 401.

Mounted on each of the carriage frame plates 402 are rollers 409 arranged to ride above and below a horizontally disposed rail 408 secured to each of the upper side frame castings 341 of the machine. Toggle links 411, 412 connect each carriage frame plate 402 with the machine upper frame casting 341. Each toggle is actuated through a long link 413 extending to the base of the machine, each link pivotally connecting a toggle joint with a cam follower arm 414, the left hand arm 414 being shown in Figs. 6 and 10, and the right hand arm 414 being shown in Fig. 11. The follower arms 414 are of double wall construction and each carries a roller 416 bearing on an associated recoding slide retract cam 415 mounted on the rear main drive shaft 30. The arms 414 are pivoted at 417 to the base frame of the machine and are positively rocked counter-clockwise by the associated cam 415 to straighten the toggle links 411, 412, thereby moving the recoding slide retract carriage rearwardly to the position shown in Fig. 7. In this position of the carriage, the hooks 404 are effective for yieldingly urging any recoding slide 370—390, which is released by its associated column of release pins 365, rearwardly into a differentially set position. The carriage is moved forwardly by springs 418, see Fig. 6, connecting each link 413 to an upper side frame 341. The forward movement of the carriage acts to restore or retract all released slides 370—390 to their normal positions. As can be seen by reference to Fig. 14, the recoding slide retract cams 415 are effective for releasing the slides from 43° to 83° which period occurs just after the release pins 365 have been raised by the master card sensing mechanism, said recoding slides being restored from 282° to 325° allowing an interval from 83° to 282° during which time the punch set pin box is reciprocated to receive a setup and to punch the detail card in accordance with the pins 385 thus selected by the associated recoding slides.

The pins 385 are operatively connected with the detail punch mechanism by a detail card wiring unit substantially similar to the master card wiring unit heretofore described. Said detail card wiring unit is disposed directly behind the master card wiring unit and comprises a frame consisting of front and rear frame plates 421, 422, suitably reinforced by an X-shaped frame support 423. Secured to the upper portion of said frame plates are a pair of pin supporting plates 424 mounting the upper wiring unit pins 425, and a pair of plates 426 mounting the upper ends of Bowden wires 427. Secured to the lower end of wiring unit frame plates are a pair of plates 428 mounting the lower end of said Bowden wires 427, and a pair of plates 431 mounting the lower wiring unit pins 432. The lower wiring unit pins 432 are disposed directly above the columns of set pins 211, heretofore described, of the detail card punch mechanism, and the upper wiring unit pins 425 are disposed directly beneath columns of punch-selecting pins 385 of the recoding unit. The Bowden wires 427 operatively interconnect each column of six punch-selecting pins 385 with the six set pins 211, relating to a corresponding upper or lower zone column of the detail card. Secured to the detail card wiring unit frames 421, 422, at each side thereof, is a mounting bar 435 having a tongue slidably fitted in a horizontally extending groove formed in a mounting block 436, said wiring unit frame also carrying a spring urged latch 437 cooperating with a stud 438 on the mounting block for locking the wiring unit in its proper position. As distinguished from the fixed mounting means for the master card wiring unit, the detail wiring unit mounting blocks 436 are reciprocated vertically so as to raise and lower the detail card wiring unit concomitantly with the set pin box of the detail card punch mechanism. For this purpose, each mounting block 436 is fixed securely to a vertically-disposed lift rod 441. As best seen in Fig. 11, the right-hand lift rod 441 is joined at its lower end to the frame casting 214 of the punch set pin box to thereby impart a concurrent vertical reciprocation to said rod through the complementary set pin cams 235, 240, and cam follower plate 237, as heretofore described. The left hand lift rod 441, as seen in Fig. 10, although not connected to the set pin box frame, is reciprocated through similar cam actuated means, said left-hand lift rod 441 being tied to an additional actuating rod 236 pivotally connected to an additional cam follower plate 237 positively reciprocated by an additional pair of complementary cams 235, 240, on the rear main drive shaft 30. It should be understood that all three pairs of complementary cams 235, 240, are of identical shape so as to actuate their respective rods 236 simultaneously, thereby reciprocating the detail card wiring unit in unison with the reciprocation of the punch set pin box, as heretofore described.

Figure 7:
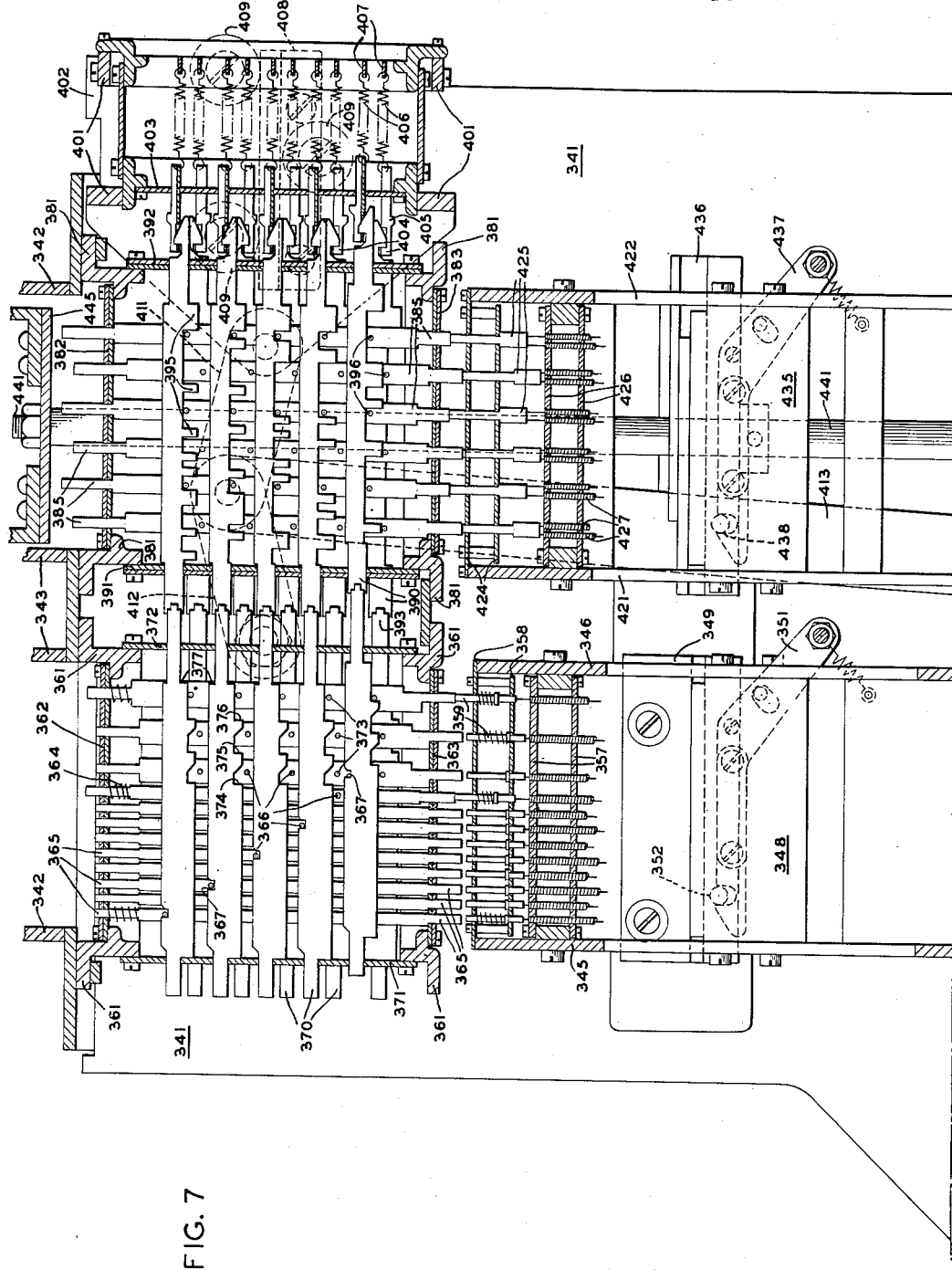

On the upward movement of the punch set pin box, which occurs from 83° to 143° of the cycle, at which time the detail card wiring unit rises from the position shown in Figs. 3 and 4 to that of Figs. 7 and 8, the upper wiring unit pins 425 are brought to bear against associated punch-selecting pins 385, displacing upwardly all pins 385 which are not blocked by the shoulders 395 on a differentially-set recoding slide 370—390. The pins 385 which are blocked or gagged against upward displacement cause a downward displacement of the corresponding wiring unit pin 425 which, in turn, through the associated Bowden wire 427 and lower wiring unit pin 432 displaces downwardly with relation to the punch set pin box a corresponding one of the set pins 211 into position for locking engagement by a locking slide 216 as heretofore described. Upon the downward movement of the set pin box and detail card wiring unit, which occurs from 226° to 286° of the cycle, the detail card is punched by those punch elements 195 associated with the set pins 211 which are thus locked in effective position.

Restoring means are provided for the punch-selecting pins 385 of the recoding unit, said means including a restoring bail 445 secured to the upper ends of the lift rods 441. Said bail normally overlies the tops of all of said pins 385 and reciprocates concurrently with the detail card wiring unit. The upward movement of said bail, to the position shown in Fig. 7, permits upward displacement of all pins which are not blocked by the recoding slides 370—390, and the downward movement of said bail, to the position shown in Fig. 3, restores all pins, which had been displaced, to their normal position. In Fig. 7, the second recoding slide 370—390 from the bottom of the bank, i. e., the recoding slide released under control of the "1" index position of the master card, is shown in a differential setting wherein the gagging shoulders 395 overlie studs 396 on the second, fourth and sixth punch-selecting pins 385, from right to left, of the associated column of said pins. Consequently, when the detail card wiring unit was raised into engagement with said column of selecting pins 385, the corresponding second, fourth and sixth upper and lower wiring unit pins 425, 432, respectively, were actuated so as to lower the corresponding set pins 211 which set pins upon the subsequent downward movement of the set pin box, will cause a punching in the second, fourth and sixth index positions of an upper zone column of the detail card.

The manner in which the recoding unit operates to convert each pattern representation of data in accordance with the master card code into a pattern representation in accordance with the detail card code may be more readily understood by more fully explaining at this point the nature of the respective master and detail codes. As heretofore mentioned, the code of the master card 65, see Fig. 13, commonly known as the Hollerith code, embraces a card column having twelve index positions, the upper three positions being designated as zone positions "12," "11," and "0," respectively, and the lower nine index positions being designated as numeric positions, 1–9, respectively. Numeric data, i. e., the nine digits, is represented by a single perforation in the correspondingly numbered one of the nine numeric positions, zero being represented by a single perforation in the "0" zone index position. Alphabetic data is represented by a combination of two perforations in a column, one of which is in a zone index position, the other being in one of the numeric index positions. The characters "A" to "I" are represented by a perforation in the "12" position in combination with a numeric position, the characters "J" through "R" employing the "11" zone index position, and the characters "S" through "Z" employing the "0" zone index position. Accordingly, any data recorded in a column of the master card will always include a perforation in either the zero or one of the numeric index positions, and if it is a single perforation will represent the correspondingly numbered numeric value. Likewise, any combinational perforation pattern will include a perforation in only one of the three zone index positions "12," "11" or "0," respectively.

The code of the detail card 165, commonly known as the Powers 90 column code, embraces card columns having six index positions, said positions being designated from the top to bottom of a column as the "0," "1," "3," "5," "7," and "9" positions respectively. Zero and the five odd digits are represented in the detail code by a single perforation in the correspondingly numbered index position, and the four even digits are represented by a combination of two perforations per column, one of which is in the "9" index position and the other being in the next lower-in-value odd digit index position. Alphabetic characters are represented in the detail code by various combinations of either three or two index positions which do not adhere to any sequential arrangement but which are fully shown in Fig. 13.

In the schematic view of Fig. 9, the recoding unit of the machine is shown in its normal restored position, the arrow-headed lines interrelating each slide release pin 365 of a column with the corresponding index position in a column of the master card 65, and also interrelating each punch-selecting pin 385 of a column with the corresponding index position in a column of the detail card 165. The solid lines extending from the pins 385 illustrate the wiring for an upper zone column of the detail card, and the broken lines illustrate the wiring for a lower zone column of the detail card. The dot-and-dash lines shown on the right side of Fig. 9 indicate the four differential settings of each of the recoding slides 370—390, the numbers and characters indicating the particular setting in which the slide is effective for converting the respective digit or character to the code of the detail card.

Each of the 10 recoding slides 370—390, when released to its full limit or differential movement, is effective for gagging the punch selecting pins 385 which represent in the detail code the numerical value associated with the recoding slide. For example, the bottom slide of a bank, i. e., the "0" slide, which is released upon the sensing of a single perforation is the "0" index position of the master card, moves its full differential extent wherein the limit face 377 abuts the plate 372. In such position the single gagging shoulder 395 is in a position for gagging the "0" punch selecting pin 385 to thereby cause a punching in the "0" index position of the detail card. The second recoding slide from the bottom of a bank, i. e., the "1" slide, when released by the "1" release pin 365 upon sensing a single perforation in the "1" index position of the master card, is released to its full differential limit wherein the widest shoulder 395 of said slide gags the "1" pin 385, thereby causing punching in the "1" index position of the detail card. The "2" recoding slide, when fully released, has a shoulder 395 in gagging relation to the "1" selecting pin 385 and the "9" selecting pin, so as to cause punching in the "1" and "9" index positions of the detail card, which combinational perforation pattern represents the numerical value "2" in the detail code. In a similar manner each of the other recoding slides, when released to their full differential limit as a result of the sensing of a single perforation in one of the numeric index positions of the master card, has one or two shoulders 395 which will be disposed for effectively gagging the pin or pins 385 which represent, either singly or in combination, the numeric value associated with such slide.

In the case of alphabetic characters, all of which are represented in the master code by a combinational perforation pattern, the recoding slides are not released to their full limit but are differentially limited in one or another setting, depending upon which of the three zone index positions is involved. For example, the character "A" is represented in the master code by a perforation in the "1" index position in combination with the "12" index position. Accordingly, upon the sensing of such combinational pattern, the "1" recoding slide will be released by the "1" pin 365 but will be differentially limited at three-quarters of its full extent of travel by a stud 373 on the "12" pin 365.

Fig. 7 illustrates the position of the parts when converting the alphabetic character "A." As seen therein, three of the shoulders 395 on the "1" recoding slide are in position for effectively gagging the "1," "5," "9," punch selecting pins 385 for thereby causing a punching in the "1," "5," "9" index positions of the detail card, which combinational pattern, as can be seen by reference to Fig. 13, represents the character "A" in the detail code.

In the event that "1" recoding slide were released to its second differential setting, i. e., as a result of the sensing of perforations in the "1" and "11" master card index positions, which represent the character "J" in the master code, the shoulders 395 on said slide which cooperate with the "1" and "5" pins 385 respectively, would still be in effective gagging relation to said "1" and "5" pins. The shoulder 395 associated with the "9" selecting pin would be clear thereof, but the shoulder associated with the "3" selecting pin would, in the second differential setting of the "1" slide, be in effective gagging relation to said "3" selecting pin 385. Accordingly, in the second differential setting of the "1" recoding slide, the "1," "3," and "5" punch selecting pins 385 would be effectively gagged, thereby effecting a punching in the "1," "3" and "5" index positions of a detail card column, which combination of index positions represents, as can be seen in Fig. 13, the character "J" in the detail code. The shoulders 395 of the "1" recoding slide, when the slide is in its first differential setting, are ineffective for gagging any of the pins 385 since the code of the master card does not employ the combination of the "0" and "1" index positions for representing either numeric or alphabetic data.

The shoulders 395 on each of the remaining recoding slides cooperate with the punch selecting pins in a similar manner, said shoulders being so arranged as to be effective for gagging different combinations of punch selecting pins 385 in each of the four differential settings of each slide. As can be best seen in Fig. 9, the shoulders engage in each differential setting, only those pins 385 which effect punching of the detail card in the index positions which represent the same data the sensing of which, from the master card, controls the differential setting of the slide, said shoulders in each of said differential settings being clear of all other punch selecting pins of the associated column.

From the foregoing it will be apparent that all data sensed in the master card, whether of numeric nature or alphabetic, will, by operation of the recoding unit, be converted from a pattern representation in accordance with the master code into a pattern representation in accordance with the detail code. For purposes of illustration, there has been herein disclosed a specific master card code, employing combinational two-position perforation patterns within a twelve-position column and a specific detail code employing combinational three-position patterns within a six-position column. It will be understood, however, that the mechanism may be readily adapted to use with other codes without departing from the principle of operation herein disclosed.

While we have described what we consider to be a highly desirable embodiment of our invention, it is obvious that many changes in form could be made without departing from the spirit of our invention, and we, therefore, do not limit ourselves to the exact form herein shown and described, nor to anything less than the whole of our invention as hereinbefore set forth, and as hereinafter claimed.

What we claim as new, and desire to secure by Letters Patent, is:

1. In a machine of the class described, means for feeding master records having columnarily arranged index positions, each column including numeric positions and zone positions wherein numerical data is represented by a single perforation in a related numeric position and alphabetic data is represented by a perforation in a numeric position in combination with a perforation in one of said zone positions, means for punching detail records having columnarly arranged index positions wherein numeric data is represented by perforations in single index positions and combinations of two index positions and alphabetic data is represented by perforations in combinations of two and three index positions, a plurality of gagging elements for selectively controlling said punching means and including one for each index position of said detail record, said elements when effective causing said punching mechanism to perforate the corresponding index positions of said detail record, a plurality of recoding slides one for each numeric index position of said master record, said slides having shoulders arranged to engage selected ones of said gagging elements for rendering the engaged gagging elements effective, each of said slides being releasable to a plurality of differential settings and effective in different settings for engaging different combinations of said gagging elements, and a plurality of slide releasing elements actuable by said sensing means for controlling the differential settings of said slides and including an element for each index position of said master card, each releasing element associated with a numeric index position releasing a related slide to a setting for engaging the gagging elements associated with the index positions of said detail record which represent the same numeric data as represented by the single master record index position associated with the controlling releasing element, each releasing element associated with a zone index position differentially limiting a released slide in a setting for engaging the gagging elements associated with those index positions of said detail record which represent in combination the same alphabetic data represented by the combined numeric and zone index positions of said master record associated with the controlling releasing elements.

2. In a machine of the class described, the combination with means for sensing records having alphabetic and numerical data represented by perforation patterns in one code, and means for punching records in perforation patterns to represent alphabetic and numerical data in another code, of recoding means for converting sensed data from a pattern in said one code to a pattern in said other code, said recoding means including a plurality of gagging elements for controlling said punching means and selectively positionable to represent the pattern to be recorded by said punching means, each of said gagging elements causing said punching means to perforate a corresponding data indicative position of said detail record, a plurality of releasing elements selectively actuable to represent the pattern sensed by said sensing means, and a plurality of recoding members differentially settable under control of said releasing elements, said recoding members having shoulders arranged to engage selected ones of said gagging elements in each differential setting, said recoding members also having limit faces arranged for engagement with predetermined ones of said releasing elements, each limit face being spaced a different distance from its associated releasing element and effective when engaging the associated releasing element for determining the differential setting of the recoding member.

3. In a machine of the class described, a recoding mechanism for converting pattern representations of alphabetic and numeric data according to a first code into pattern representations of the same data according to a second code, said recoding mechanism including a plurality of individually settable releasing elements arranged in columns, the elements of each column being settable in a combinational pattern to represent in accordance with said first code the data to be recoded, a plurality of selectively positionable selecting elements arranged in columns, the selecting elements of each column being positionable in a combinational pattern to represent alphabetic and numerical data in accordance with said second code, and a plurality of recoding members arranged in banks, each bank operatively interconnecting a column of said releasing elements with a column of said selecting elements, each recoding member of a bank being releasable under control of a related one of said releasing elements and differentially limited in a plurality of settings by other ones of said releasing elements of the same column, each of said recoding members having means effective in each setting for selectively positioning those selecting elements of an associated column which represent in said second code the same data represented by the releasing elements set to control the differential setting of said recoding member.

4. In a machine of the class described, a recoding mechanism for converting pattern representations of alphabetic and numerical data according to a first code into pattern representations of the same data according to a second code, said recoding mechanism including a plurality of individually settable releasing elements arranged in columns, the elements of each column being settable in a combinational pattern to represent in accordance with said first code the data to be recoded, a plurality of selectively positionable selecting elements arranged in columns, the selecting elements of each column being positionable in a combinational pattern to represent alphabetic and numerical data in accordance with said second code, and a plurality of recoding members arranged in banks, each bank operatively interconnecting a column of said releasing elements with a column of said selecting elements, each recoding member of a bank being releasable under control of a related one of said releasing elements and differentially limited in various settings by other ones of said releasing elements of the same column, each of said recoding members being formed with shoulders arranged to engage with said selecting elements, said shoulders in each differential setting of a recoding member selectively positioning those selecting elements of an associated column which represent in said second code the same data as represented by the releasing elements set to control the differential setting of said recoding member.

5. In a machine of the class described, a recoding mechanism for converting pattern representations of alphabetic and numeric data according to a first code into pattern representations of the same data according to a second code, said recoding mechanism including a plurality of individually settable releasing elements arranged in columns, the elements of each column being settable in a combinational pattern to represent in accordance with said first code the data to be recoded, a plurality of selectively positionable selecting elements arranged in columns, the selecting elements of each column being positionable in a combinational pattern to represent alphabetic and numerical data in accordance with said second code, and a plurality of recoding members arranged in banks, each bank operatively interconnecting a column of said releasing elements with a column of said selecting elements, each recoding member of a bank being releasable under control of a related one of said releasing elements and having differentially spaced limit faces cooperating with other ones of said releasing elements of the same column to determine differential settings for said recoding member, each of said recoding members also having means effective in each setting for selectively positioning those selecting elements of an associated column which represent in said second code the same data as represented by the releasing elements set to control the differential setting of said recoding member.

6. In a machine of the class described, a recoding mechanism for converting pattern representations of alphabetic and numeric data according to a first code into pattern representations of the same data according to a second code, said recoding mechanism including a plurality of individually settable releasing elements arranged in columns, the elements of each column being settable in a combinational pattern to represent in accordance with said first code the data to be recoded, a plurality of selectively positionable selecting elements arranged in columns, the selecting elements of each column being positionable in a combinational pattern to represent alphabetic and numerical data in accordance with said second code, and a plurality of recoding members arranged in banks, each bank operatively interconnecting a column of said releasing elements with a column of said selecting elements, each recoding member of a bank being releasable under control of a related one of said releasing elements and having differentially spaced limit faces cooperating with other ones of said releasing elements of the same column to determine differential settings for said recoding member, each of said recoding members being formed with shoulders arranged to engage with said selecting elements, said shoulders in each differential setting of a recoding member selectively positioning those selecting elements of an associated column which represent in said second code the same data as represented by the releasing element set to control the differential setting of said recoding member.

7. In a record reproducing machine of the class described operating through a succession of cycles and including a sensing mechanism cyclically reciprocated for detecting data representations in one of a pair of related records and a punching mechanism selectively controlled by said sensing mechanism and cyclically reciprocated to record data representations in the other one of said pair of related records, a first feeding mechanism operable for advancing records to said sensing mechanism, record stopping means for retaining a record in sensed relation to said sensing mechanism and cyclically operable for releasing the record after each sensing operation, means for disabling the operation of said record stopping means, said disabling means when effective causing said stopping means to retain the record in sensing relation of the sensing means for a succeeding sensing operation, a second feeding means for advancing records to said punching mechanism, record detecting means associated with said second feeding means and disposed to engage records advancing to said punching mechanism, said detecting means including a cyclically reciprocable rotatable member yieldingly releasable to bear on the surface of a record advancing to said punching mechanism, the releasing movement of said member being limited in intermediate position when the record is advancing to said punching mechanism, said releasing movement carrying said member to a further position when there is no record advancing to said punching mechanism, and means actuable in response to the movement of said member to said further position for rendering said disabling means effective to cause said record stopping means to retain a record in sensing relation to said sensing means for a successive sensing operation.

8. In a record reproducing machine of the class described, operating through a succession of cycles and including a sensing mechanism cyclically reciprocated for detecting data representations in one of a pair of related records and a punching mechanism selectively controlled by said sensing mechanism and cyclically reciprocated to record data representations in the other one of said pair of related records, a first feeding mechanism for advancing records to said sensing mechanism, means for disabling the operation of said feeding mechanism, record stopping means for retaining a record in sensing relation to said sensing mechanism and cyclically operated to release the record after its sensing operation, means for disabling the operation of said record stopping means, said disabling means when effective causing said stopping means to retain a record in sensing relation to said sensing means for a successive sensing operation, a second feeding mechanism for advancing records to said punching mechanism, record detecting means associated with said second feeding mechanism and disposed to engage records advancing to said punching mechanism, said detecting means including a cyclically reciprocable rotatable member yieldingly releasable to bear on the surface of a record advancing to said punching mechanism, the releasing movement of said member being limited in an intermediate position when the record is advancing to said punching mechanism, said releasing movement carrying said movement to a further position when there is no record advancing to said punching mechanism, and means actuable in response to the movement of said member to said further position for rendering said disabling means for said first feeding mechanism and for said record stopping means effective to prevent the advance of a record by said first feeding mechanism and to cause said card stopping means to retain a record in sensing relation to said sensing means for a successive sensing operation.

9. In a record reproducing machine of the class described operating through a succession of cycles and including a sensing mechanism cyclically reciprocated for detecting data representations in one pair of related records and a punching mechanism selectively controlled by said sensing mechanism and cyclically reciprocated to record data representations in the other one of said pair of related records, a first feeding mechanism operable for advancing records to said sensing mechanism, record stopping means for retaining a record in sensing relation to said sensing mechanism and cyclically operable for releasing the record after each sensing operation, means for disabling the operation of said record stopping means, said disabling means when effective preventing the release of a record by said record stopping means, machine stopping means including an element settable to stop the machine at the completion of a machine cycle, a second feeding mechanism for advancing records to said punching mechanism, record detecting means disposed for engagement with a record advancing to said punching mechanism, said detecting means including a rotatable record engaging member mounted for reciprocable movement and yieldingly releasable during one machine cycle and restored during the following machine cycle, said member having an intermediate released position when bearing on a record advancing to said punching mechanism and a further released position when there is no record advancing to said punching mechanism, means responsive to the releasing movement of said member to said further position for setting said machine stopping element to stop the machine at the completion of the same machine cycle, and means responsive to the movement of said member to said further released position and operable in the following machine cycle for rendering said disabling means effective to cause said record stopping means to retain a record in sensing relation to said sensing means for a successive sensing operation.

References Cited in the file of this patent

UNITED STATES PATENTS

| | | |
|---|---|---|
| 2,046,082 | Mills | June 30, 1936 |
| 2,108,681 | Lasker | Feb. 15, 1938 |
| 2,346,268 | Mills | Apr. 11, 1944 |
| 2,387,828 | Braun | Oct. 30, 1945 |
| 2,595,889 | Ryffel | May 6, 1952 |